US012260696B2

(12) United States Patent
Saito et al.

(10) Patent No.: US 12,260,696 B2
(45) Date of Patent: Mar. 25, 2025

(54) HISTORY MANAGEMENT APPARATUS, HISTORY MANAGEMENT SYSTEM, HISTORY MANAGEMENT METHOD, AND NON-TRANSITORY COMPUTER-READABLE MEDIUM

(71) Applicant: NEC Corporation, Tokyo (JP)

(72) Inventors: Maya Saito, Tokyo (JP); Kouhei Okinaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 46 days.

(21) Appl. No.: 18/024,898

(22) PCT Filed: Sep. 18, 2020

(86) PCT No.: PCT/JP2020/035506

§ 371 (c)(1),
(2) Date: Mar. 6, 2023

(87) PCT Pub. No.: WO2022/059179

PCT Pub. Date: Mar. 24, 2022

(65) Prior Publication Data

US 2023/0316840 A1 Oct. 5, 2023

(51) Int. Cl.
*G07C 9/38* (2020.01)
*G07C 9/37* (2020.01)

(52) U.S. Cl.
CPC .................................... *G07C 9/38* (2020.01); *G07C 9/37* (2020.01)

(58) Field of Classification Search
CPC ........ G07C 9/38; G07C 9/37; G07C 9/00119; G07C 9/00071; G06Q 20/40145; G06Q 20/3224; H04L 63/10
See application file for complete search history.

(56) References Cited

U.S. PATENT DOCUMENTS 7,614,078 B1 * 11/2009 Stieglitz .................. H04L 9/321 713/157
2015/0106888 A1 * 4/2015 Cheng ..................... H04L 63/10 726/5

(Continued)

FOREIGN PATENT DOCUMENTS

JP 2002-352291 A 12/2002
JP 2003-044892 A 2/2003

(Continued)

OTHER PUBLICATIONS

International Search Report for PCT Application No. PCT/JP2020/035506, mailed on Nov. 24, 2020.

(Continued)

*Primary Examiner* — Vernal U Brown

(57) ABSTRACT

A history management apparatus includes a storage unit configured to store usage application information of a user in a region into which entry is restricted by biometric authentication, a cancellation control unit configured to cancel, in a case where a predetermined visitor has succeeded in biometric authentication at a gateway of the region, and the usage application information is satisfied, restriction on entry into the region, a history registration unit configured to register, into the storage unit, history information of a visitor who has succeeded in the biometric authentication, a generation unit configured to generate, in a case where a disclosure request for the history information has been received from a terminal of a predetermined disclosure requestor, disclosed information obtained by performing predetermined processing on the history information in accordance with an attribute of the disclosure requestor, and an output unit configured to output the disclosed information to the terminal.

9 Claims, 12 Drawing Sheets

(56) References Cited

U.S. PATENT DOCUMENTS

| | | | | |
|---|---|---|---|---|
| 2015/0310444 A1* | 10/2015 | Chen | G06Q 20/308 | |
| | | | 705/44 | |
| 2015/0325067 A1* | 11/2015 | Lee | G07C 9/00174 | |
| | | | 340/5.65 | |

FOREIGN PATENT DOCUMENTS

| | | | |
|---|---|---|---|
| JP | 2008-242514 | A | 10/2008 |
| JP | 2009-116600 | A | 5/2009 |
| JP | 2012-155577 | A | 8/2012 |
| JP | 2016-191281 | A | 11/2016 |
| JP | 2019-138145 | A | 8/2019 |
| JP | 6690074 | B1 | 4/2020 |
| JP | 2020-144443 | A | 9/2020 |
| WO | 2008/066130 | A1 | 6/2008 |

OTHER PUBLICATIONS

JP Office Action for JP Application No. 2022-550301, mailed on Feb. 21, 2023.

Office Action issued Apr. 11, 2023 in Japanese Application No. 2022-550301.

JP Office Action for JP Application No. 2023-113511, mailed on Oct. 22, 2024 with English Translation.

* cited by examiner

HISTORY MANAGEMENT APPARATUS, HISTORY MANAGEMENT SYSTEM, HISTORY MANAGEMENT METHOD, AND NON-TRANSITORY COMPUTER-READABLE MEDIUM

This application is a National Stage Entry of PCT/JP2020/035506 filed on Sep. 18, 2020, the contents of all of which are incorporated herein by reference, in their entirety.

TECHNICAL FIELD

The present invention relates to a history management apparatus, a history management system, a history management method, and a non-transitory computer-readable medium, and more particularly to a history management apparatus, a history management system, a history management method, and a non-transitory computer-readable medium for managing a history of entry of a visitor into a predetermined region.

BACKGROUND ART

In a complex housing such as a condominium building, common facilities exist aside from residences. When a resident uses a common facility, the resident preliminarily makes a user application, makes a reservation, and also makes payment for cost corresponding to usage. In addition, users can include visitors other than residents. In addition, there has been recently an increasing number of complex housings that restrict entry into common facilities and residences using biometric authentication for better security.

Patent Literature 1 discloses a technique related to an access control system that performs pass control on entry into a facility, by performing face authentication of a person whose face image is pre-registered, at a gateway or the like of the facility. The access control system stores an entry history of a person of which entry has been permitted.

Patent Literature 2 discloses a technique related to an entry management device that manages entry into each room by face authentication in a complex housing or the like in which a plurality of rooms is held together. In addition, the entry management device holds an authentication history, and presents the authentication history in accordance with a request.

CITATION LIST

Patent Literature

Patent Literature 1: International Patent Publication No. WO2008/066130

Patent Literature 2: Japanese Unexamined Patent Application Publication No. 2002-352291

SUMMARY OF INVENTION

Technical Problem

However, the techniques disclosed in Patent Literatures 1 and 2 have been unable to adjust a disclosure scope in accordance with various disclosure requestors who request disclosure of authentication history information. For example, the disclosure requestors can include a building manager, a developer of a complex housing, and the like aside from residents of the complex housing. At the time, it is necessary to adjust a disclosure scope.

The present disclosure has been made to solve such a problem, and an object of the present disclosure is to provide a history management apparatus, a history management system, a history management method, and a non-transitory computer-readable medium for performing control of an appropriate disclosure scope suitable for a disclosure requestor, as for an authentication history of a facility of which entry restriction is cancelled by authentication.

Solution to Problem

A history management apparatus according to a first aspect of the present disclosure includes

- storage means for storing usage application information of a user in a region into which entry is restricted by biometric authentication,
- cancellation control means for canceling, in a case where a predetermined visitor has succeeded in biometric authentication at a gateway of the region, and the usage application information is satisfied, restriction on entry into the region,
- history registration means for registering, into the storage means, history information of a visitor who has succeeded in the biometric authentication,
- generation means for generating, in a case where a disclosure request for the history information has been received from a terminal of a predetermined disclosure requestor, disclosed information obtained by performing predetermined processing on the history information in accordance with an attribute of the disclosure requestor, and
- output means for outputting the disclosed information to the terminal.

A history management system according to a second aspect of the present disclosure includes

- an authentication terminal installed at a gateway of a region into which entry is restricted by biometric authentication,
- a history management apparatus configured to manage history information of cancellation of entry restriction, and
- a terminal of a disclosure requestor for the history information, wherein the history management apparatus includes

- storage means for storing usage application information of a user in the region,
- cancellation control means for canceling, in a case where a predetermined visitor has succeeded in biometric authentication via the authentication terminal, and the usage application information is satisfied, restriction on entry into the region,
- history registration means for registering, into the storage means, history information of a visitor who has succeeded in the biometric authentication,
- generation means for generating, in a case where a disclosure request for the history information has been received from the terminal, disclosed information obtained by performing predetermined processing on the history information in accordance with an attribute of the disclosure requestor, and
- output means for outputting the disclosed information to the terminal.

A history management method according to a third aspect of the present disclosure is a history management method to be executed by a computer, and includes,

- canceling, in a case where a predetermined visitor has succeeded in biometric authentication at a gateway of a region into which entry is restricted by biometric authentication, and usage application information of a user in the region is satisfied, restriction on entry into the region, registering, into a storage device, history information of a visitor who has succeeded in the biometric authentication, generating, in a case where a disclosure request for the history information has been received from a terminal of a predetermined disclosure requestor, disclosed information obtained by performing predetermined processing on the history information in accordance with an attribute of the disclosure requestor, and outputting the disclosed information to the terminal.

A non-transitory computer-readable medium storing a history management program according to a fourth aspect of the present disclosure causes a computer to execute processing of canceling, in a case where a predetermined visitor has succeeded in biometric authentication at a gateway of a region into which entry is restricted by biometric authentication, and usage application information of a user in the region is satisfied, restriction on entry into the region, processing of registering, into a storage device, history information of a visitor who has succeeded in the biometric authentication, processing of generating, in a case where a disclosure request for the history information has been received from a terminal of a predetermined disclosure requestor, disclosed information obtained by performing predetermined processing on the history information in accordance with an attribute of the disclosure requestor, and processing of outputting the disclosed information to the terminal.

Advantageous Effects of Invention

By the present disclosure, it is possible to provide a history management apparatus, a history management system, a history management method, and a non-transitory computer-readable medium for performing control of an appropriate disclosure scope suitable for a disclosure requestor, as for an authentication history of a facility of which entry restriction is cancelled by authentication.

EXAMPLE EMBODIMENT

Figure 1:
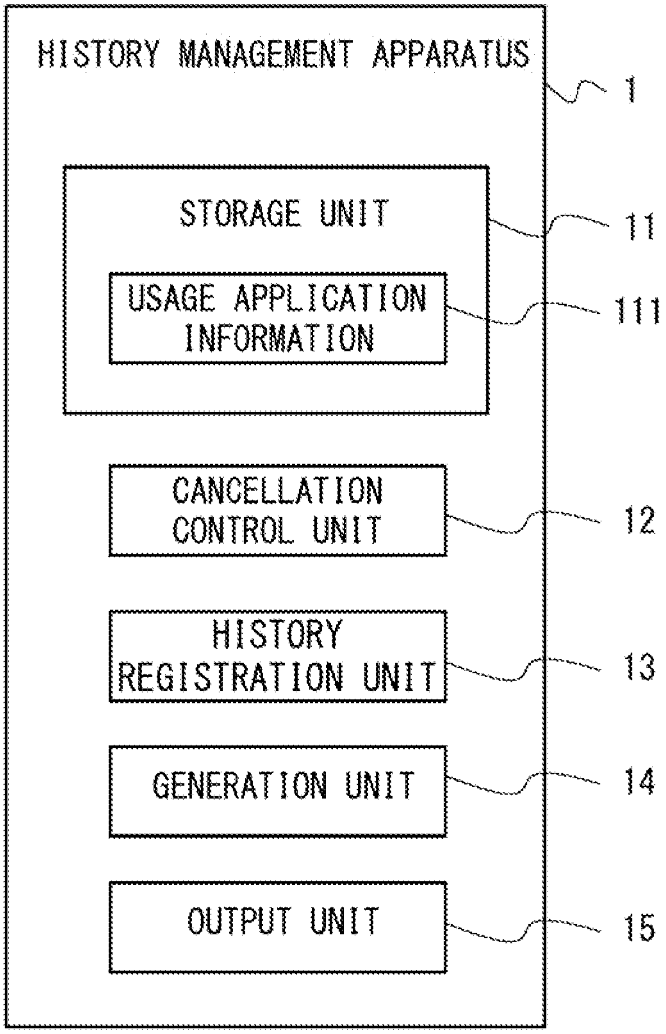
FIG. 1 is a block diagram illustrating a configuration of a history management apparatus according to a first example embodiment.

Hereinafter, example embodiments of the present disclosure will be described in detail with reference to the drawings. In the drawings, the same or corresponding elements are denoted by the same reference signs, and an overlapping description is omitted as necessary for clarity of description.

First Example Embodiment

FIG. 1 is a block diagram illustrating a configuration of a history management apparatus 1 according to a first example embodiment. The history management apparatus 1 is an information processing apparatus for accumulating a history of cancellation of entry restriction that is made in accordance with biometric authentication of a visitor whose usage application is preliminarily made, in a region into which entry is restricted by biometric authentication, and making disclosure of the history to a predetermined disclosure requestor. Here, the history management apparatus 1 is connected to a network (not illustrated). The network may be a wired network or a wireless network. In addition, an authentication terminal (locking system, not illustrated) for imposing restriction on entry into a region, and a terminal of a disclosure requestor of history information are connected to the network. Then, the locking system is installed at a gateway of a region, and locking of the gateway can be cancelled in accordance with a cancellation instruction from the history management apparatus 1. In addition, the terminal is an information terminal to be operated by a disclosure requestor.

The history management apparatus 1 includes a storage unit 11, a cancellation control unit 12, a history registration unit 13, a generation unit 14, and an output unit 15. The storage unit 11 is a storage device that stores usage application information 111 of a user in a region into which entry is restricted by biometric authentication. In a case where a predetermined visitor succeeds in biometric authentication at a gateway of a region, and the usage application information 111 is satisfied, the cancellation control unit 12 cancels restriction on entry into the region. the history registration unit 13 registers history information of a visitor who has succeeded in biometric authentication, into the storage unit 11. In a case where a disclosure request for history information has been received from a terminal of a predetermined disclosure requestor, the generation unit 14 generates disclosed information obtained by performing predetermined processing on history information in accordance with an attribute of the disclosure requestor. The output unit 15 outputs the disclosed information to the terminal.

Figure 2:
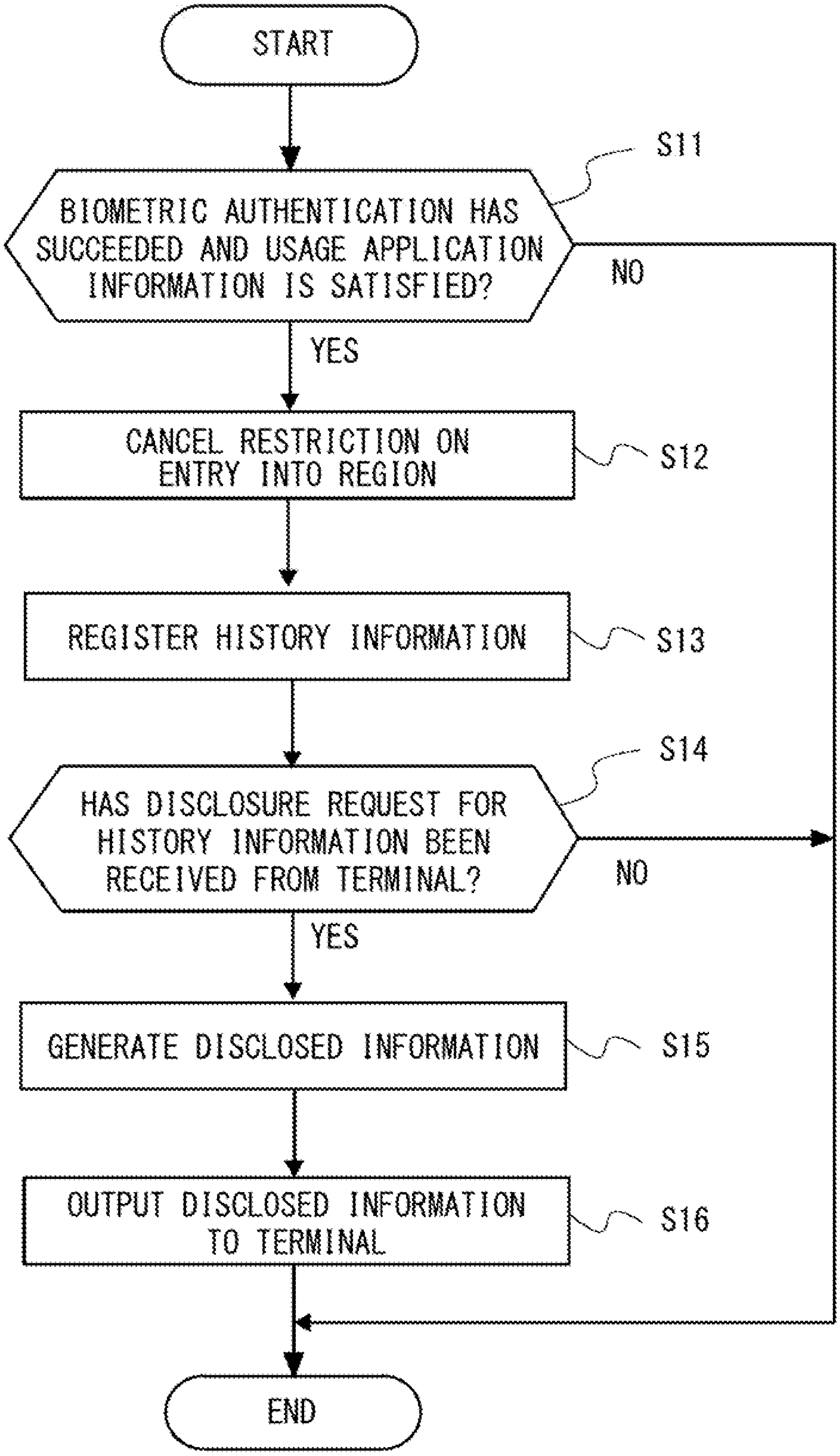
FIG. 2 is a flowchart illustrating a flow of a history management method according to the first example embodiment.

FIG. 2 is a flowchart illustrating a flow of a history management method according to the first example embodiment. As a premise, the usage application information 111 is pre-registered in the storage unit 11. Then, a predetermined visitor is assumed to have reached a gateway of a region. Then, an authentication terminal installed at the gateway of the region acquires biometric information from the visitor, and transmits a biometric authentication request including the biometric information, to the history management apparatus 1.

Here, the cancellation control unit 12 controls biometric authentication of the biometric information included in the received biometric authentication request, with pre-registered biometric information of a plurality of persons. Note that, in a case where biometric information of a plurality of persons is stored in advance in the history management apparatus 1, the cancellation control unit 12 performs authentication processing. Alternatively, in a case where face feature information of a plurality of persons is stored in advance in an authentication apparatus (not illustrated) outside the history management apparatus 1, the cancellation control unit 12 causes the authentication apparatus to perform authentication and acquires the authentication result.

Then, the cancellation control unit 12 determines whether or not biometric authentication has succeeded. In a case where biometric authentication has succeeded, the cancellation control unit 12 determines whether or not a user (visitor) who has succeeded in biometric authentication satisfies the usage application information 111 as a user (S11).

In a case where it is determined in Step S11 that the visitor has succeeded in biometric authentication, and satisfies the usage application information 111, the cancellation control unit 12 cancels restriction on entry into the region (S12). For example, the cancellation control unit 12 transmits a cancellation instruction to an authentication terminal (locking system) installed at the gateway of the region. Accordingly, the authentication terminal cancels restriction on entry into the region. Then, the history registration unit 13 registers history information of the visitor who has succeeded in biometric authentication, into the storage unit 11 (S13).

After that, the generation unit 14 determines whether or not a disclosure request for history information has been received from a terminal of a predetermined disclosure requestor (S14). In a case where the disclosure request has been received, the generation unit 14 generates disclosed information obtained by performing predetermined processing on history information in accordance with an attribute of the disclosure requestor (S15). Then, the output unit 15 outputs the disclosed information to the terminal (S16).

In this manner, in the present example embodiment, in a case where a visitor whose usage application is preliminarily made has succeeded in biometric authentication at a gateway of a region, and satisfies usage application information, restriction on entry into the region is cancelled, and at the time, history information is stored. Here, the history information includes information regarding a visitor and an applicant of a usage application, and the like, in addition to information regarding authentication, and includes personal information of the visitor and the applicant. Accordingly, the history management apparatus 1 generates disclosed information obtained by performing predetermined processing on history information in accordance with an attribute of a disclosure requestor, and presents the disclosure requestor to a disclosure request. That is, disclosed information can be processed in such a manner that disclosed information for a certain disclosure requestor includes personal information, and disclosed information for another disclosure requestor excludes personal information. Thus, it is possible to perform control of an appropriate disclosure scope suitable for a disclosure requestor, as for an authentication history of a facility of which entry restriction is cancelled by authentication.

Note that the history management apparatus 1 includes a processor, a memory, and a storage device as components not illustrated. Furthermore, the storage device stores a computer program in which processing of a history management method according to the present example embodiment is implemented. Then, the processor reads the computer program from the storage device into the memory, and executes the computer program. As a result, the processor implements the functions of the cancellation control unit 12, the history registration unit 13, the generation unit 14, and the output unit 15.

Alternatively, each of the cancellation control unit 12, the history registration unit 13, the generation unit 14, and the output unit 15 may be implemented by dedicated hardware. In addition, some or all of the components of each device may be implemented by a general-purpose or dedicated circuitry, a processor, or the like, or a combination thereof. These may be implemented by a single chip or may be implemented by a plurality of chips connected via a bus. Some or all of the components of each device may be implemented by a combination of the above-described circuit or the like and a program. Furthermore, a central processing unit (CPU), a graphics processing unit (GPU), a field-programmable gate array (FPGA), a quantum processor (quantum processor control chip), or the like can be used as the processor.

Furthermore, in a case where some or all of the components of the history management apparatus 1 are implemented by a plurality of information processing apparatuses, circuits, and the like, the plurality of information processing apparatuses, circuits, and the like may be arranged in a centralized manner or in a distributed manner. For example, the information processing apparatuses, the circuits, and the like may be implemented in a form in which each of them is connected via a communication network, such as a client server system or a cloud computing system. Furthermore, the function of the history management apparatus 1 may be provided in a software as a service (SaaS) format.

Second Example Embodiment

Figure 3:
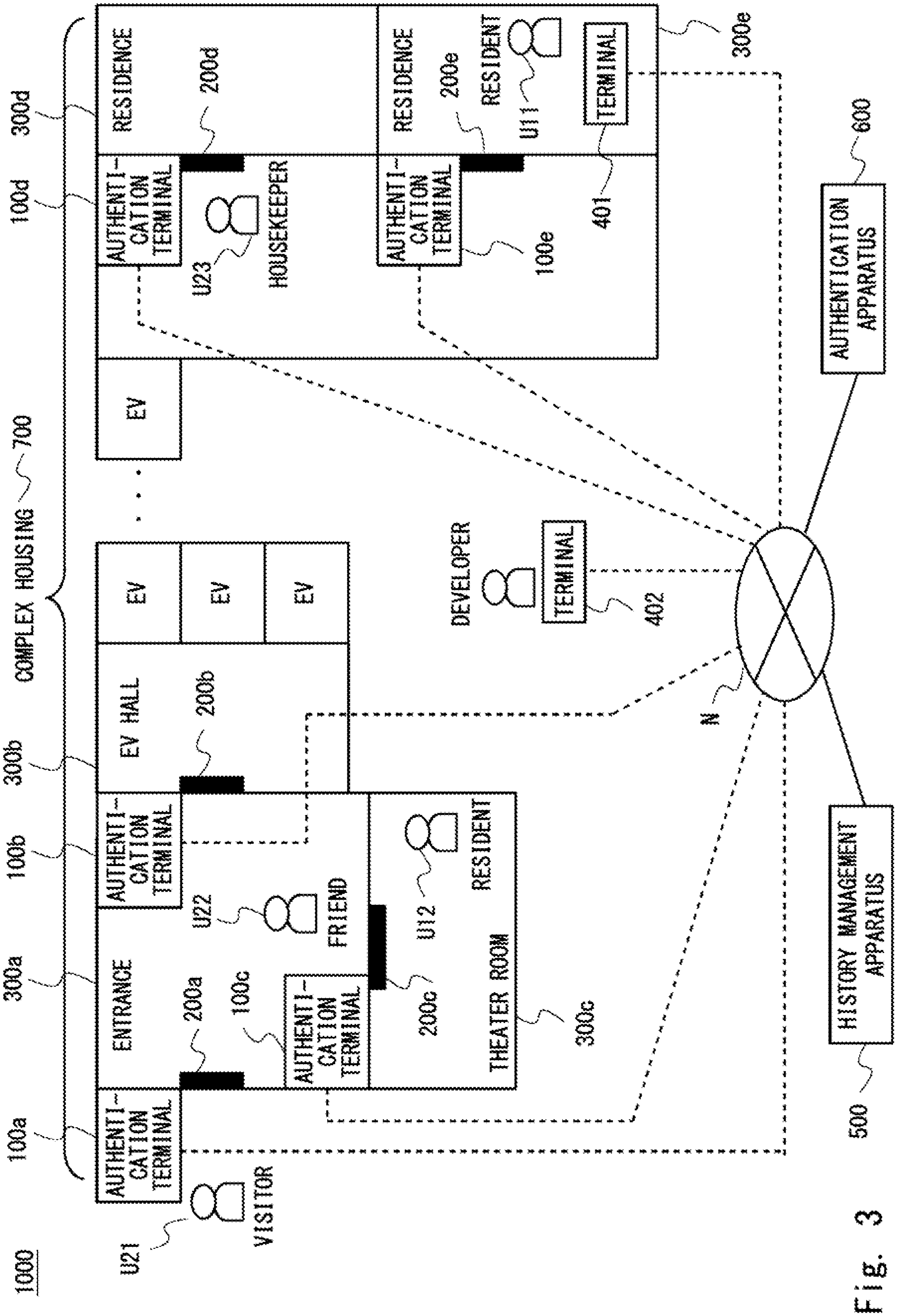
FIG. 3 is a block diagram illustrating an overall configuration of a history management system according to a second example embodiment.

A second example embodiment is a specific example of the first example embodiment described above. FIG. 3 is a block diagram illustrating an overall configuration of a history management system 1000 according to the second example embodiment. The history management system 1000 is an information system for controlling entry into each region (entrance 300*a*, EV hall 300*b*, theater room 300*c*, residence 300*d*, and residence 300*e*) existing in the complex housing 700. Note that examples of regions of the complex housing 700 and the arrangement of the regions are not limited to these. The history management system 1000 includes authentication terminals 100*a* to 100*e*, gate devices 200*a* to 200*e*, terminals 401 and 402, a history management apparatus 500, and an authentication apparatus 600. In addition, the authentication terminals 100*a* to 100*e*, the terminals 401 and 402, the history management apparatus 500, and the authentication apparatus 600 are connected via a network N. Here, the network N is a wired or wireless communication line. In the following description, the biometric authentication is face authentication, and the biometric information is face feature information. However, other technologies using a captured image can be applied to the biometric authentication and the biometric information. For example, as the biometric information, data (feature amount) calculated from a physical feature unique to an individual, such as a fingerprint, a voiceprint, a vein, a retina, or a pattern of an iris of a pupil may be used.

First of all, a resident U11, a resident U12, or the like of the complex housing 700 is assumed to have registered a face image and personal information (name, gender, credit information, or the like) of itself, and terminal information of a terminal to be used, into the history management apparatus 500 and the authentication apparatus 600. That is, the resident U11 or the like is an example of a legitimate user of the complex housing 700. In addition, common facilities (study room, theater room, parking area, or the like) exist in the complex housing 700 aside from residences. Then, each of the residences and common facilities will be referred to as a "region". In particular, to use common facilities, the resident U11 or the like needs to make a reservation and bear the cost.

The entrance 300*a*, the EV hall 300*b*, the theater room 300*c*, the residence 300*d*, and the residence 300*e* serve as an example of regions into which entry is restricted by biometric authentication. Note that the entrance 300*a*, the EV hall 300*b*, and the theater room 300*c* serve as an example of common facilities of the complex housing 700. The authentication terminal 100*a* and the gate device 200*a* are installed at a gateway of the entrance 300*a*. The entrance 300*a*, the EV hall 300*b*, and the theater room 300*c* are adjacent to each other. Thus, the authentication terminal 100*b* and the gate device 200*b* installed at a gateway of the EV hall 300*b* are installed at the boundary between the entrance 300*a* and the EV hall 300*b*. In addition, the authentication terminal 100*c* and the gate device 200*c* installed at a gateway of the theater room 300*c* are installed at the boundary between the entrance 300*a* and the theater room 300*c*. In addition, one or more elevators (EVs) are installed in the EV hall 300*b*, and migration to a floor of the residences 300*d* and 300*e* is enabled by a certain elevator. The authentication terminal 100*d* and the gate device 200*d* are installed at a gateway of the residence 300*d*. In addition, the authentication terminal 100*e* and the gate device 200*e* are installed at a gateway of the residence 300*e*.

For example, the resident U11 of the complex housing 700 preliminarily makes a usage application for the visitor U21 entering the entrance 300*a*, using the terminal 401. In this case, the visitor U21 succeeds in face authentication executed via the authentication terminal 100*a*, and the gate device 200*a* is unlocked, whereby the visitor U21 can enter the entrance 300*a*.

In addition, for example, to use the theater room 300*c* together with a friend U22, the resident U12 of the complex housing 700 has preliminarily made a usage application for the resident U12 and the friend U22 using a terminal (not illustrated) of itself. In this case, the friend U22 succeeds in face authentication executed via the authentication terminal 100*a*, and the gate device 200*a* is unlocked, whereby the friend U22 can enter the entrance 300*a*. Subsequently, the friend U22 succeeds in face authentication executed via the authentication terminal 100*c*, and the gate device 200*c* is unlocked, whereby the friend U22 can enter theater room 300*c*. However, because the friend U22 fails in face authentication executed by the authentication terminal 100*b*, the friend U22 cannot enter the EV hall 300*b* and the residences 300*d* and 300*e*.

In addition, for example, to cause a housekeeper U23 to execute cleaning while residents (family) of the residence 300*d* are absent, a resident (not illustrated) of the residence 300*d* of the complex housing 700 has preliminarily made a usage application for the housekeeper U23 entering the residence 300*d*, using a terminal (not illustrated) of the resident. In this case, the housekeeper U23 succeeds in face authentication executed via the authentication terminal 100*a*, 100*b*, and 100*d*. Thus, the housekeeper U23 can enter the residence 300*d* via the entrance 300*a* and the EV hall 300*b*. However, the housekeeper U23 cannot enter the theater room 300*c* and the residence 300*e*.

Note that, in the following description, regions from the entrance 300*a* to the residence 300*e* will be sometimes simply referred to as regions 300. Similarly, the authentication terminals 100*a* to 100*e* will be sometimes simply referred to as authentication terminals 100. In addition, the gate devices 200*a* to 200*e* will be sometimes simply referred to as gate devices 200. In addition, each of the authentication terminals 100*a* to 100*e* is an example of a locking system. In addition, the gate device 200 is a flapper gate, an automatic door, or a normal door, for example, and locking can be cancelled (cancellation of entry restriction) in accordance with a cancellation instruction from the connected authentication terminal 100.

The authentication apparatus 600 is an information processing apparatus that stores face feature information of a plurality of persons. In response to a face authentication request received from the outside, the authentication apparatus 600 collates a face image or face feature information included in the request, with face feature information of each user, and transmits, as a response, the collation result (authentication result) to a request source.

Figure 4:
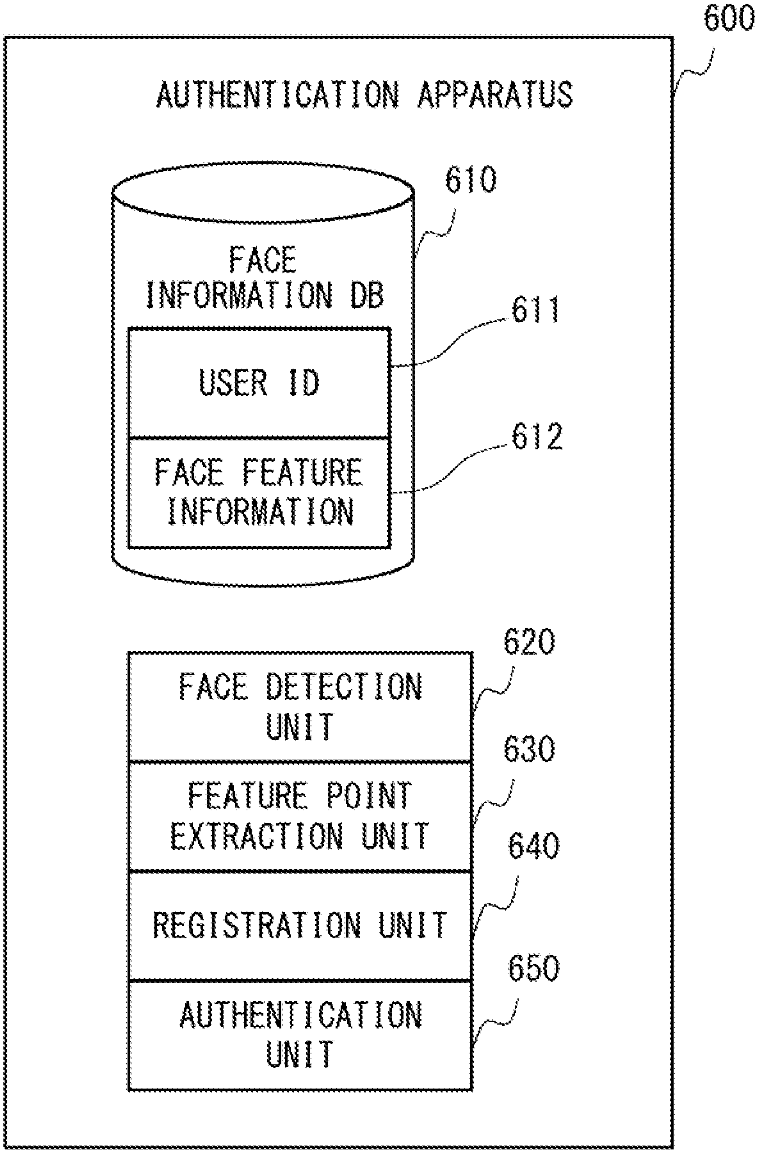
FIG. 4 is a block diagram illustrating a configuration of an authentication apparatus according to the second example embodiment.

FIG. 4 is a block diagram illustrating a configuration of the authentication apparatus 600 according to the second example embodiment. The authentication apparatus 600 includes a face information database (DB) 610, a face detection unit 620, a feature point extraction unit 630, a registration unit 640, and an authentication unit 650. The face information DB 610 stores a user ID 611 and face feature information 612 of the user ID in association with each other. The face feature information 612 is a set of feature points extracted from a face image. Note that the authentication apparatus 600 may delete the face feature information 612 in the face feature DB 610 in response to a request from a user whose face feature information 612 is registered. Alternatively, the authentication apparatus 600 may delete the face feature information 612 after a lapse of a certain period from the registration of the face feature information.

The face detection unit 620 detects a face region included in a registration image for registering face information, and outputs the face region to the feature point extraction unit 630. The feature point extraction unit 630 extracts a feature point from the face region detected by the face detection unit 620, and outputs face feature information to the registration unit 640. In addition, the feature point extraction unit 630 extracts a feature point included in a face image received from the history management apparatus 500, the terminal 401, the authentication terminal 100, or the like, and outputs face feature information to the authentication unit 650.

The registration unit 640 newly issues the user ID 611 when registering the face feature information. The registration unit 640 registers the issued user ID 611 and the face feature information 612 extracted from a registration image, in association with each other into the face information DB 610. Note that, after registration, the registration unit 640 notifies the history management apparatus 500 of the user ID 611 and a face image or the face feature information 612. The authentication unit 650 performs face authentication using the face feature information 612. Specifically, the authentication unit 650 collates face feature information extracted from a face image, with the face feature information 612 in the face information DB 610. In a case where collation has succeeded, the authentication unit 650 identifies the user ID 611 associated with the face feature information 612 retrieved in the collation. The authentication unit 650 transmits, as a face authentication result, a reply indicating whether or not the pieces of face feature information match each other, to the history management apparatus 500. Whether or not the pieces of face feature information match each other corresponds to the success or failure of the authentication. A case where the pieces of face feature information match each other means a case where the degree of matching is equal to or higher than a predetermined value. In addition, in a case where face authentication has succeeded, the face authentication result includes the identified user ID.

Note that the authentication unit 650 does not need to attempt collation with all pieces of face feature information 612 in the face information DB 610. For example, it is desirable that the authentication unit 650 preferentially attempts collation with face feature information registered in a period from a date of reception of the face authentication request to a date several days before the date of reception. As a result, a collation speed can be increased. In a case where the preferential collation has failed, it is desirable that collation with all pieces of remaining face feature information is performed.

Figure 5:
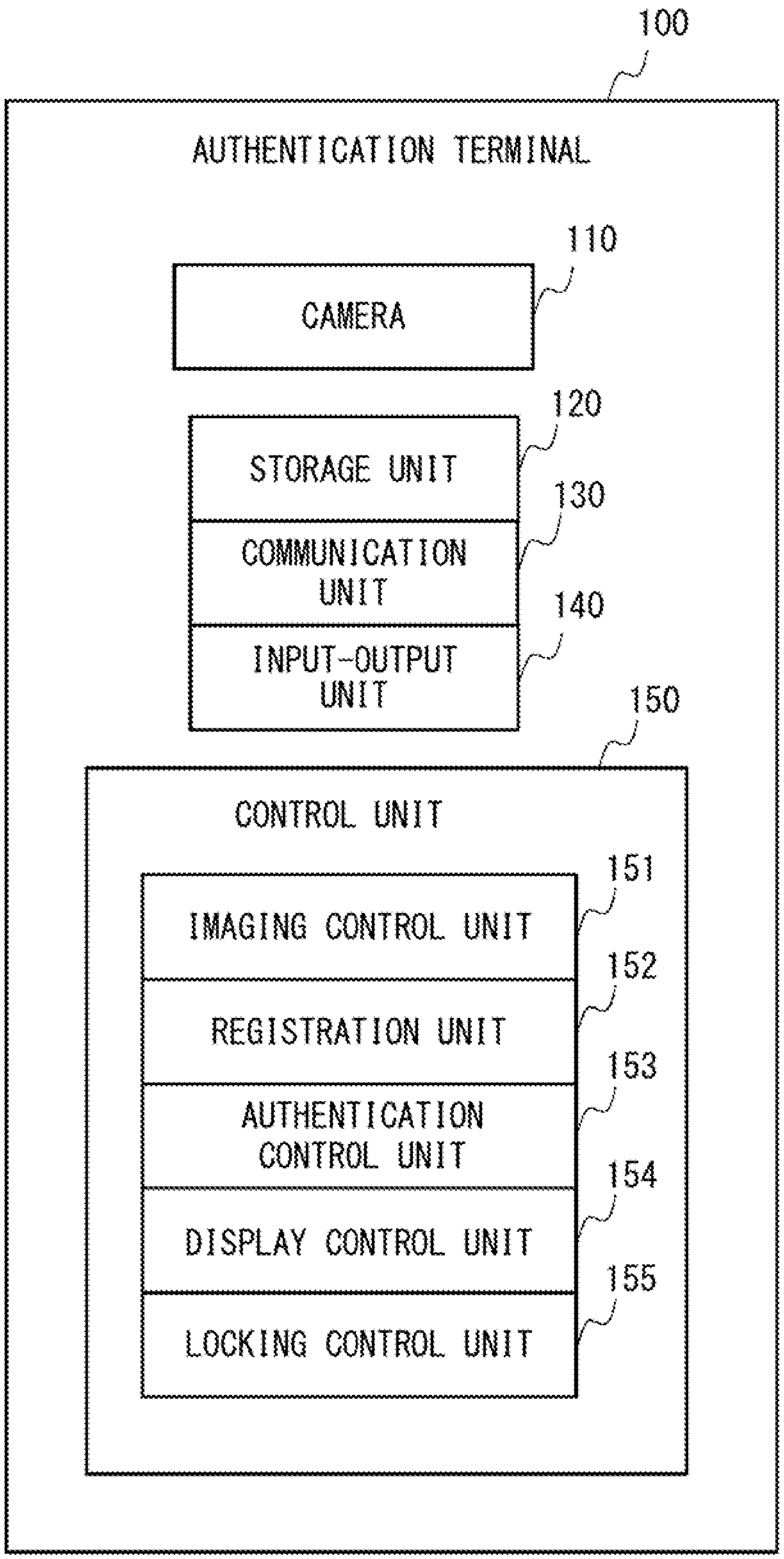
FIG. 5 is a block diagram illustrating a configuration of an authentication terminal according to the second example embodiment.

Subsequently, the authentication terminal 100 is an information processing apparatus installed at a gateway of a predetermined region, and connected with the gate device 200 similarly installed at the gateway. FIG. 5 is a block diagram illustrating a configuration of an authentication terminal (locking system) 100 according to the second example embodiment. The authentication terminal 100 includes a camera 110, a storage unit 120, a communication unit 130, an input-output unit 140, and a control unit 150.

The camera 110 is an imaging device that performs image capturing in accordance with the control of the control unit 150. The storage unit 120 is a storage device that stores a program for implementing each function of the authentication terminal 100. The communication unit 130 is a communication interface with the network N. The input-output unit 140 includes a display device (display unit) such as a screen, and an input device. The input-output unit 140 may be a touch panel, for example. The control unit 150 controls hardware included in the authentication terminal 100. The control unit 150 includes an imaging control unit 151, a registration unit 152, an authentication control unit 153, a display control unit 154, and a locking control unit 155.

The imaging control unit 151 controls the camera 110 to capture a registration image or an authentication image of a user existing at a gateway of a predetermined region. The registration image and the authentication image are images at least including a face region of the user (resident or visitor, or the like). The imaging control unit 151 outputs the registration image to the registration unit 152. In addition, the imaging control unit 151 output the authentication image to the authentication control unit 153.

The registration unit 152 transmits a face information registration request including the registration image, to the authentication apparatus 600 via the network N. The authentication control unit 153 transmits a face authentication request including the authentication image, to the history management apparatus 500 via the network N. At this time, the authentication control unit 153 includes a region ID of a corresponding predetermined region and an image capturing time of the authentication image (face image), into the face authentication request. Note that identification information (terminal ID) of the authentication terminal 100 may be included in place of the region ID. The display control unit 154 receives various types of screen data from the history management apparatus 500 via the network N, and displays the received screen data on the input-output unit 140. In a case where the locking control unit 155 has received a cancellation instruction from the history management apparatus 500 via the network N, the locking control unit 155 outputs the cancellation instruction to the corresponding gate device 200.

Returning to FIG. 3, the description will be continued. The terminal 401 is an information terminal owned by a resident U11. Note that, the resident U11 is a resident (legitimate user) of the residence 300*e*. The terminal 401 is a mobile phone terminal, a smartphone, a tablet terminal, a personal computer (PC) on which a camera is mounted or to which a camera is connected, or the like, for example. The terminal 401 is associated with a user ID or face feature information of the resident U11. That is, the terminal 401 is a terminal identifiable based on a user ID or face feature information in the history management apparatus 500. For example, the terminal 401 is a terminal into which the resident U11 has logged using a user ID of itself.

The terminal 401 transmits, to the history management apparatus 500 via the network N, a usage application including a user name entered by the resident U11, a specific region (usage application target region), and a usage application period. In addition, the terminal 401 receives an application result (permitted or denied) from the history management apparatus 500 via the network N, and displays the application result on a screen or the like. In addition, the terminal 401 may transmit a registration request including a face image of a user such as the visitor U21, to the history management apparatus 500 via the network N. Alternatively, the terminal 401 may transmit a registration destination request to the history management apparatus 500 via the network N, and transmit registration destination information returned from the history management apparatus 500, to a terminal (not illustrated) of the visitor U21 or the like via the network N. Alternatively, in a case where a user name of a user who has made a usage application is a name of a visitor from the outside, the terminal 401 may receive registration destination information from the history management apparatus 500 via the network N, and transmit the registration destination information to the terminal of the visitor U21 or the like. Here, the registration destination information may be a uniform resource locator (URL) of the authentication apparatus 600 or the like. Then, the terminal 401 receives a user ID issued for the visitor U21 or the like, and a face image of the visitor U21 or the like, from the history management apparatus 500 via the network N. The terminal 401 displays the received face image on a screen. The terminal 401 may receive the designation of an accessible range of the visitor U21 or the like based on an entry made by the resident U11. In a case where the resident U11 checks the display of the face image of the visitor U21 or the like and the terminal 401 receives the entry of acceptance, the terminal 401 transmits information indicating the acceptance, to the history management apparatus 500 via the network N.

In a case where a terminal (not illustrated) of the visitor U21 or the like receives registration destination information from the terminal 401 via the network N, the terminal transmits a face image of itself to a destination indicated by the registration destination information, via the network N.

In addition, in accordance with an entry made by the resident U11, the terminal 401 transmits a disclosure request for history information of entry (authentication success) into the residence 300*e*, to the history management apparatus 500 via the network N. At this time, the disclosure request includes a user ID of the resident U11 and a region ID of the residence 300*e*. In addition, the disclosure request may include a disclosure target period. The terminal 401 receives disclosed information from the history management apparatus 500 via the network N, and displays the disclosed information on a screen.

The terminal 402 is an information terminal owned by a developer U3 of the complex housing 700. Note that the developer U3 is a user other than a legitimate user of the complex housing 700. Users other than a legitimate user of the complex housing 700 include a building manager (management association) of the complex housing 700. In addition, in accordance with an entry made by the developer U3, the terminal 402 transmits a disclosure request for history information of entry (authentication success) into the theater room 300*c*, to the history management apparatus 500 via the network N. At this time, the disclosure request includes a user ID of the developer U3 and a region ID of the theater room 300*c*. In addition, the disclosure request may include a disclosure period. The terminal 402 receives disclosed information from the history management apparatus 500 via the network N, and displays the disclosed information on a screen.

The history management apparatus 500 is an information processing apparatus for controlling the entry of a user (resident or visitor, or the like) into a predetermined region, and managing a history of entry (authentication). The history management apparatus 500 may be redundant in a plurality of servers, and each functional block may be implemented by a plurality of computers.

Figure 6:
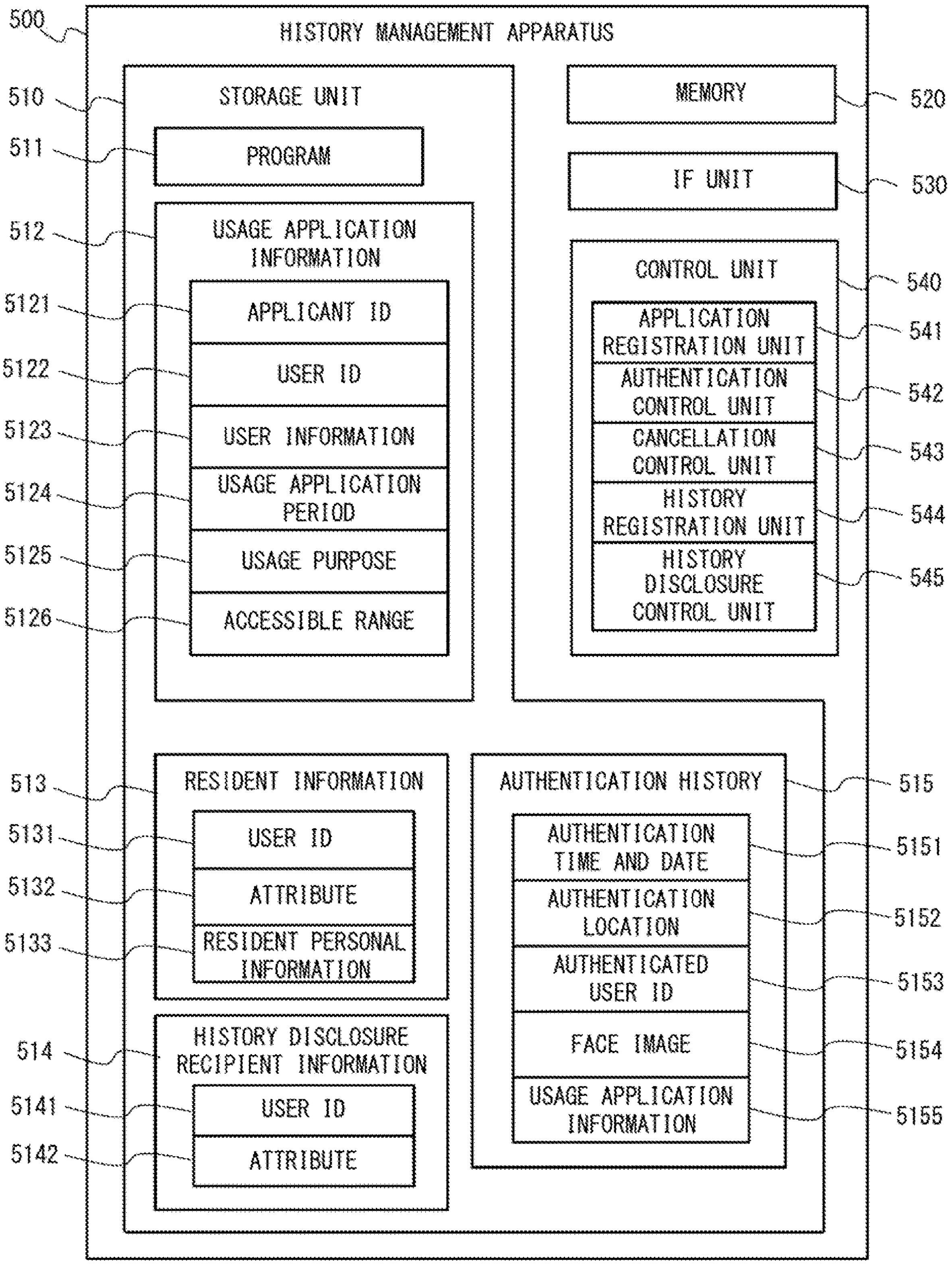
FIG. 6 is a block diagram illustrating a configuration of a history management apparatus according to the second example embodiment.

Next, the history management apparatus 500 will be described in detail. FIG. 6 is a block diagram illustrating a configuration of the history management apparatus 500 according to the second example embodiment. The history management apparatus 500 includes a storage unit 510, a memory 520, an interface (IF) unit 530, and a control unit 540. The storage unit 510 is an example of a storage device such as a hard disk or a flash memory. The storage unit 510 stores a program 511, usage application information 512, resident information 513, history disclosure recipient information 514, and an authentication history 515. The program 511 is a computer program in which the processing of a history management method according to the second example embodiment is implemented.

The usage application information 512 is information for managing a permitted usage application among usage applications of a specific region from applicants such as the resident U11. An applicant ID 5121, a user ID 5122, user information 5123, a usage application period 5124, a usage purpose 5125, and an accessible range 5126 are associated with the usage application information 512.

The applicant ID 5121 is a user ID of the resident U11 or the like who has made a usage application. Thus, the applicant ID 5121 sometimes corresponds to the user ID 611 in the face information DB 610 described above, a user ID 5131 in the resident information 513 to be described later, or a user ID 5141 to be described later.

The user ID 5122 is a user ID of a user (resident or visitor) targeted in a usage application. Thus, the user ID 5122 corresponds at least to the user ID 611 in the face information DB 610 described above. That is, the face information DB 610 and the usage application information 512 are associated with each other via a user ID.

The user information 5123 is detailed information regarding a user corresponding to the user ID 5122, and includes personal information and attribute information. The personal information in the user information 5123 includes a name, age, contact information (mobile phone number), or the like of the user, for example. The attribute information in the user information 5123 includes information indicating whether the user is a friend or a housekeeper, an age-group (for example, 30's), gender, or the like, for example.

The usage application period 5124 is a period during which a user can use regions inside the accessible range 5126. In other words, the usage application period 5124 is a period during which a user is permitted to pass through each region existing before the user reaches a specific region, and to stay in the specific region.

The usage purpose 5125 is information indicating a purpose for which the user uses a specific region targeted in the usage application. The usage purpose 5125 is "cleaning", "play", "viewing", or the like, for example. Note that the usage purpose 5125 may be called a visiting purpose.

The accessible range 5126 is a set of regions through which a user is permitted to pass, or in which a user is permitted to stay. The accessible range 5126 includes one or more region IDs. That is, the accessible range 5126 at least includes a region ID corresponding to a specific region targeted in a usage application. Then, in a case where a user passes through a plurality of regions before reaching a specific region targeted in a usage application, from a gateway of a facility, the accessible range 5126 includes a region ID of each of the regions through which the user passes.

The resident information 513 is information for managing a resident of the complex housing 700. The resident information 513 is an example of the registration information described above. A user ID 5131, an attribute 5132, and resident personal information 5133 are associated with the resident information 513. The user ID 5131 is identification information of a resident. The attribute 5132 is attribute information of a resident corresponding to the user ID 5131. The attribute 5132 is information indicating whether a resident is a head of a household of a residence, a marital partner of a head of a household, or a child of a head of a household, indicating whether a resident is an adult or a minor, indicating gender, or indicating a grade or the like of an owned or a leased residence, for example. The attribute 5132 may include a user ID of a cohabiter of a user of the associated user ID 5131. In addition, the attribute 5132 may include information indicating a family relationship (parent, child) among cohabiters. In addition, the attribute 5132 may include information indicating a hierarchy of authority among cohabiters. For example, the attribute 5132 may be information indicating that, among cohabiters, authorities of a head of a household and a marital partner of the head are relatively stronger, and authority of a child of the head is relatively weaker. In addition, the attribute 5132 may indicate that authority of an adult is stronger than authority of a minor. In addition, the attribute 5132 may be information indicating authority corresponding to a grade of a residence. The resident personal information 5133 includes a name, age, contact information (mobile phone number), credit information (debit account number), or the like of a resident corresponding to the user ID 5131, for example.

The history disclosure recipient information 514 is information defining a user to whom history information is permitted to be disclosed, and an attribute of the user. The user ID 5141 and an attribute 5142 are associated with the history disclosure recipient information 514. The user ID 5141 includes a user ID of a resident (legitimate user), and a user ID of the developer U3 or the like (user other than a legitimate user). The attribute 5142 is information indicating whether a user is a resident (legitimate user) or a user other than a resident (other than a legitimate user).

The authentication history 515 is history information of biometric authentication at a predetermined region (authentication location). Here, the authentication history 515 is information recorded in a case where biometric authentication succeeds, it is determined that the usage application information 512 is satisfied, and entry restriction of a region is cancelled. Nevertheless, the authentication history 515 may include a history of a failure in authentication.

Authentication time and date 5151, an authentication location 5152, an authenticated user ID 5153, a face image 5154, and usage application information 5155 are associated with the authentication history 515. The authentication time and date 5151 correspond to information indicating time and date at which biometric authentication has succeeded. The authentication time and date 5151 may be an image capturing time included in a face authentication request received from the authentication terminal 100. The authentication location 5152 is information indicating a location where biometric authentication has been performed. For example, the authentication location 5152 may be a region ID included in a face authentication request received from the authentication terminal 100, or a region name corresponding to the region ID. The authenticated user ID 5153 is a user ID included in a face authentication result obtained when biometric authentication has succeeded. The face image 5154 is a face image included in a face authentication request received from the authentication terminal 100. Here, the face image 5154 is a face image obtained when face authentication has succeeded. The usage application information 5155 is usage application information obtained when biometric authentication has succeeded, and it is determined that the usage application information 512 is satisfied. The usage application information 5155 may be identification information of the usage application information 512.

The memory 520 is a volatile storage device such as a random access memory (RAM), and is a storage region for temporarily holding information when the control unit 540 operates. The IF unit 530 is a communication interface with the network N.

The control unit 540 is a processor (i.e., control device) that controls each configuration of the history management apparatus 500. The control unit 540 reads the program 511 from the storage unit 510 into the memory 520, and executes the program 511. As a result, the control unit 540 implements the functions of an application registration unit 541, an authentication control unit 542, a cancellation control unit 543, a history registration unit 544, and a history disclosure control unit 545.

The application registration unit 541 registers a usage application received from the terminal 401, into the storage unit 510 as the usage application information 512 in a case where the application is to be permitted. In addition, in a case where the application registration unit 541 has received a registration destination request from the terminal 401, the application registration unit 541 may return destination information of the authentication apparatus 600 to the terminal 401 as registration destination information.

The authentication control unit 542 controls face authentication of a face image included in a face authentication request received from the authentication terminal 100. More specifically, the authentication control unit 542 causes the authentication apparatus 600 to perform face authentication of the face image. For example, the authentication control unit 542 transmits a face authentication request including the acquired captured image, to the authentication apparatus 600 via the network N, and receives a face authentication result from the authentication apparatus 600. Note that the authentication control unit 542 may detect a face region of a user from the face image and include an image of the face region in the face authentication request. Alternatively, the authentication control unit 542 may extract face feature information from the face region and include the face feature information in the face authentication request. The authentication control unit 542 acquires a face authentication result from the authentication apparatus 600 via the network N, and outputs the face authentication result to the cancellation control unit 543.

The cancellation control unit 543 is an example of the cancellation control unit 12 described above. In a case where a predetermined visitor succeeds in face authentication at a gateway of a certain region, and the usage application information 111 is satisfied, the cancellation control unit 543 cancels restriction on entry into the region. In other words, in a case where a condition of the usage application information 512 is satisfied for a user who has succeeded in face authentication, the cancellation control unit 543 outputs a cancellation instruction to the authentication terminal 100 that has performed face authentication request.

The history registration unit 544 is an example of the history registration unit 13 described above. In a case where a cancellation instruction is output by the cancellation control unit 543, the history registration unit 544 registers the authentication history 515 of a visitor (authenticated user) who has succeeded in face authentication, into the storage unit 510.

The history disclosure control unit 545 is an example of the generation unit 14 and the output unit 15 described above. The history disclosure control unit 545 receives a disclosure request for history information from the terminal 401 or the terminal 402. The history disclosure control unit 545 generates disclosed information obtained by performing predetermined processing on history information in accordance with an attribute of a disclosure requestor of the received disclosure request. Then, the history disclosure control unit 545 outputs the disclosed information to a terminal of a request source.

Specifically, first of all, the history disclosure control unit 545 identifies the attribute 5142 of a disclosure requestor from a user ID included in the disclosure request, based on the history disclosure recipient information 514. Then, the history disclosure control unit 545 determines whether the identified attribute is a resident or an attribute other than a resident (developer or the like). In a case where an attribute of a disclosure requestor is an attribute other than a legitimate user of the complex housing 700, the history disclosure control unit 545 desirably performs processing of excluding personal information from history information. For example, the history disclosure control unit 545 generates disclosed information while excluding personal information of a user and personal information of an applicant.

In addition, in a case where an attribute of a disclosure requestor is a legitimate user (resident) of the complex housing 700, the history disclosure control unit 545 desirably performs processing of excluding, from history information, information obtained in a case where a visitor is a legitimate user. That is, the history disclosure control unit 545 generates disclosed information while excluding, from the authentication history 515, information of which the authenticated user ID 5153 corresponds to the user ID 5131 in the resident information 513.

In addition, it is desirable that the history disclosure control unit 545 identifies applicant information corresponding to history information, from the usage application information 5155 in the authentication history 515, and generates disclosed information including the identified applicant information.

In addition, it is desirable that the history disclosure control unit 545 identifies a usage purpose corresponding to history information, from the usage application information 5155 in the authentication history 515, and generates disclosed information including the identified usage purpose.

In addition, the history disclosure control unit 545 desirably generates disclosed information including information regarding a location where a visitor has succeeded in biometric authentication (for example, authentication location 5152).

Figure 7:
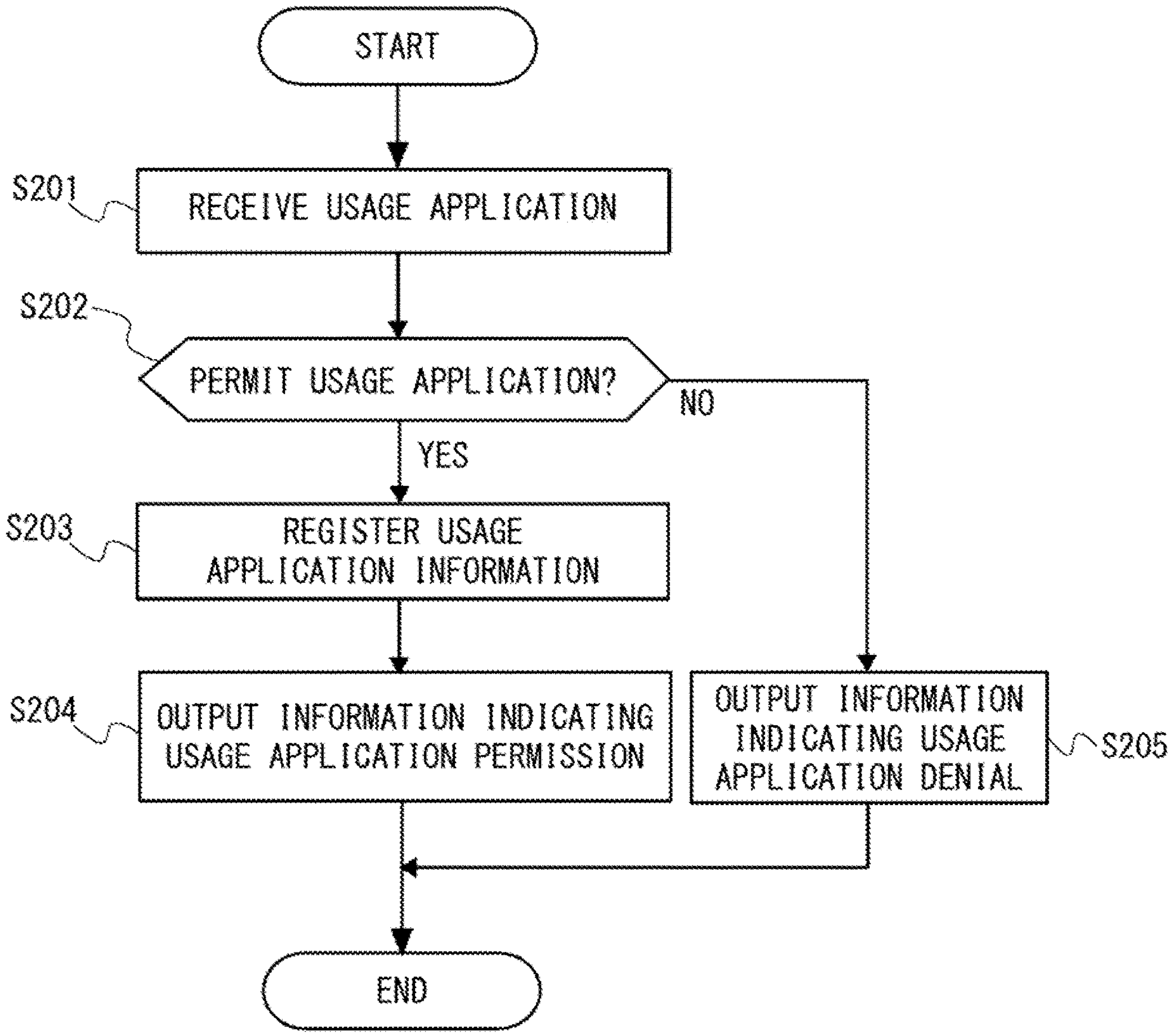
FIG. 7 is a flowchart illustrating a flow of usage application processing according to the second example embodiment.

FIG. 7 is a flowchart illustrating a flow of usage application processing according to the second example embodiment. Here, the resident U11 is assumed to make a usage application for the visitor U21 using (entering) the entrance 300*a*.

First of all, the terminal 401 transmits, the history management apparatus 500 via the network N, a usage application including a user name entered by the resident U11 (name of the visitor U21), a specific region (region ID of the entrance 300*a*), and a usage application period. Note that the terminal 401 includes a user ID of the resident U11 who has logged into (a usage application making application, or the like of) the terminal 401, into the usage application as an applicant ID. In addition, the terminal 401 may include personal information and attribute information of a user into a usage application. In addition, the terminal 401 may include a face image of a user into a usage application. Alternatively, in a case where a user ID of a user is known (for example, in the case of a resident of the complex housing 700 or a visitor targeted in a usage application made in the past, or the like), the terminal 401 may include the user ID into a usage application in place of a face image. In addition, the terminal 401 may include a usage purpose of a user into a usage application.

Accordingly, the application registration unit 541 of the history management apparatus 500 receives a usage application by receiving a usage application via the network N (S201). Next, the application registration unit 541 determines whether or not to permit the usage application (S202). More specifically, the application registration unit 541 determines whether or not to permit the usage application, based on an attribute of an applicant or a usage application history (not illustrated) of a usage application made by the applicant. Specifically, the application registration unit 541 identifies, from the resident information 513, the attribute 5132 associated with an applicant ID (the user ID 5131) included in the usage application, and determines whether or not to permit the usage application for a region targeted in the usage application, in accordance with the identified attribute. For example, in a case where the specific region is the residence 300*d* and the identified attribute indicates a resident of the residence 300*d*, the application registration unit 541 determines to permit the usage application. In addition, in a case where a usage frequency of an applicant that is based on a usage application history is equal to or smaller than a predetermined number of times, the application registration unit 541 may determine to permit the usage application.

In a case where it is determined in Step S202 that the usage application is not to be performed, the application registration unit 541 outputs information indicating usage application denial (S205). For example, the history management apparatus 500 transmits a message indicating usage application denial, to the terminal 401 via the network N.

On the other hand, in a case where it is determined in Step S202 that the usage application is to be permitted, the application registration unit 541 generates the usage application information 512, and registers the usage application information 512 into the storage unit 510 (S203). For example, the application registration unit 541 generates the usage application information 512 including the applicant ID 5121 and the usage application period 5124 included in the usage application.

In addition, in a case where a user targeted in the usage application is the visitor U21 or the like, the processing is performed as follows. First of all, in a case where the usage application does not include personal information and attribute information of a user, and a usage purpose, the application registration unit 541 requests these pieces of information from the terminal 401, and generates the usage application information 512 including personal information and attribute information of the user that has been acquired from the terminal 401, as the user information 5123, and including the acquired usage purpose as the usage purpose 5125. In addition, if the usage application includes a user ID, the application registration unit 541 includes the user ID into the usage application information 512 as the user ID 5122. On the other hand, if the usage application does not include a user ID and includes a face image, the application registration unit 541 transmits a face information registration request including the face image, to the authentication apparatus 600 via the network N. As a result, the authentication apparatus 600 issues a user ID, and registers the issued user ID 611 and the face feature information 612 extracted from the face image, into the face information DB 610 in association with each other. Then, the authentication apparatus 600 transmits, as a response, the issued user ID to the history management apparatus 500. Accordingly, the application registration unit 541 receives the issued user ID from the authentication apparatus 600 via the network N, and includes the user ID into the usage application information 512 as the user ID 5122.

Note that, in a case where a user ID included in the usage application indicates a resident, the application registration unit 541 acquires the attribute 5132 and the resident personal information 5133 corresponding to the user ID (the user ID 5131), from the resident information 513, and includes the acquired attribute 5132 and the resident personal information 5133 into the usage application information 512 as the user information 5123.

In addition, the application registration unit 541 identifies the accessible range 5126 based on an attribute of an applicant and arrangement information (not illustrated) of each region in the complex housing 700, and includes the accessible range 5126 into the usage application information 512. The application registration unit 541 identifies the accessible range 5126 including each region through which a user passes before reaching a specific region from a gateway of the complex housing 700. Here, the application registration unit 541 includes a region ID of the entrance

300*a* into the accessible range 5126. Nevertheless, for example, in a case where a specific region related to a usage application is the residence 300*d*, the application registration unit 541 includes the respective region IDs of the entrance 300*a*, the EV hall 300*b*, and the residence 300*d* into the accessible range 5126.

After that, the application registration unit 541 outputs information indicating usage application permission (S204). For example, the history management apparatus 500 transmits a message indicating usage application permission, to the terminal 401 via the network N.

Figure 8:
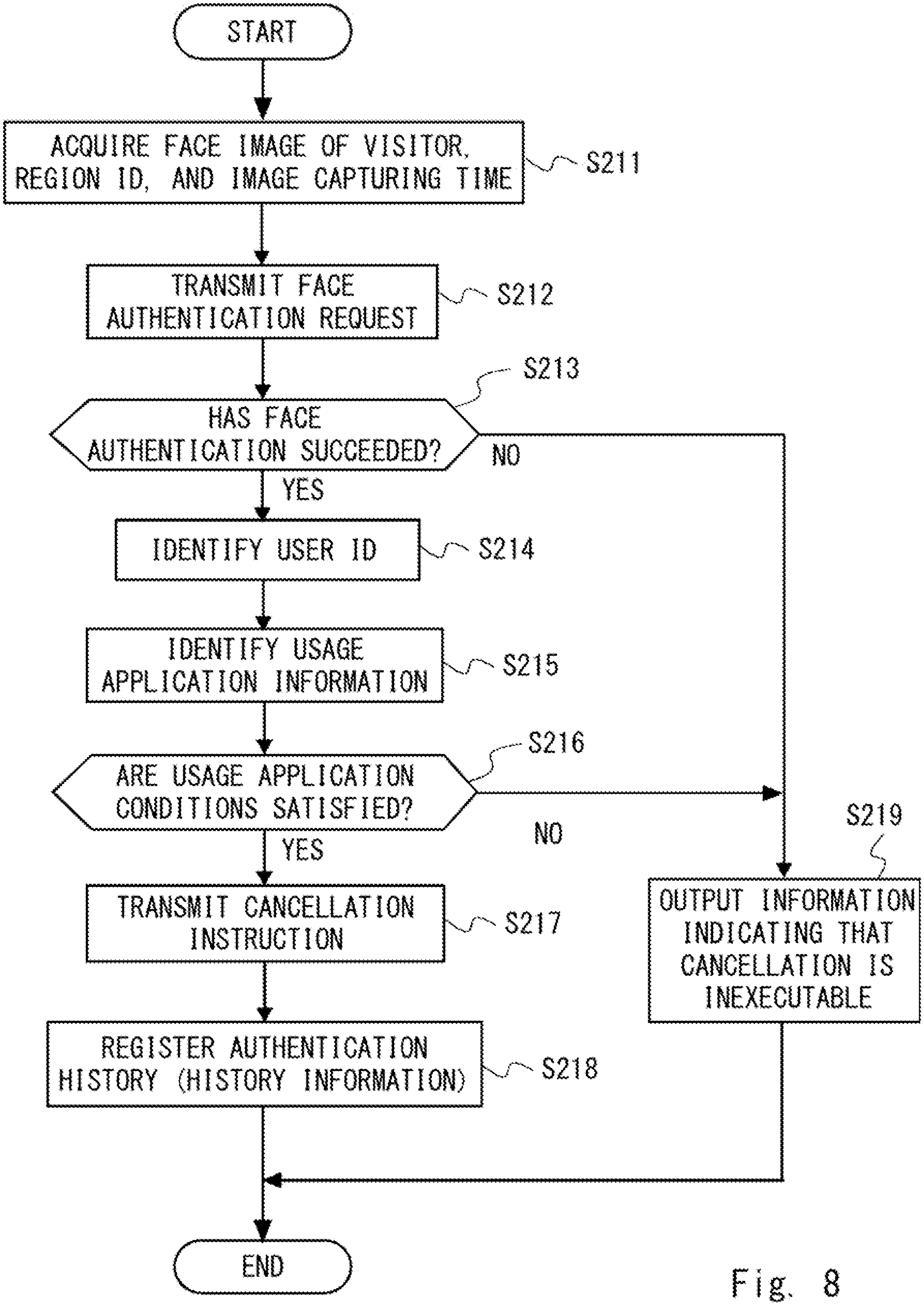
FIG. 8 is a flowchart illustrating a flow of entry control processing according to the second example embodiment.

FIG. 8 is a flowchart illustrating a flow of entry control processing according to the second example embodiment. Here, it is assumed that the usage application processing illustrated in FIG. 7 has already been executed. First of all, the visitor U21 is assumed to have arrived at the gateway of the entrance 300*a* of the complex housing 700. Here, the authentication terminal 100*a* captures a face image of the visitor U21. Then, the authentication terminal 100*a* transmits a face authentication request including the captured face image, a region ID of the entrance 300*a*, and an image capturing time, to the history management apparatus 500 via the network N. Accordingly, the authentication control unit 542 of the history management apparatus 500 acquires the face image, the region ID, and the image capturing time included in the face authentication request, from the authentication terminal 100*a* via the network N (S211)

Then, the authentication control unit 542 transmits the acquired face authentication request including the face image, to the authentication apparatus 600 via the network N (S212). The authentication apparatus 600 receives the face authentication request from the history management apparatus 500 via the network N, and performs face authentication processing based on the face image included the face authentication request. Specifically, the face detection unit 620 detects a face region from the face image. Then, the feature point extraction unit 630 extracts face feature information from the face region. Then, the authentication unit 650 collates the extracted face feature information with the face feature information 612 in the face information DB 610. In a case where the pieces of face feature information match each other, that is, the degree of matching between the pieces of face feature information is equal to or higher than a predetermined value, the authentication unit 650 identifies the user ID 611 of the user whose face feature information matches, and generates a face authentication result including information indicating a success in face authentication, and the identified user ID. On the other hand, in a case where there is no matching face feature information, the authentication unit 650 generates a face authentication result including information indicating a failure in face authentication. After that, the authentication unit 650 transmits the generated face authentication result to the history management apparatus 500 via the network N.

Accordingly, the authentication control unit 542 of the history management apparatus 500 receives the face authentication result from the authentication apparatus 600 via the network N, and outputs the face authentication result to the cancellation control unit 543. Then, the cancellation control unit 543 determines whether or not face authentication has succeeded (first condition), based on the face authentication result (S213). In a case where it is determined that face authentication has succeeded, the cancellation control unit 543 identifies a user ID included in the face authentication result (S214). Then, the cancellation control unit 543 identifies the usage application information 512 including the user ID 5122, using the identified user ID as the user ID 5122 (S215).

Then, the cancellation control unit 543 determines whether or not usage application conditions are satisfied (S216). Specifically, the cancellation control unit 543 acquires the usage application period 5124 and the accessible range 5126 from the identified usage application information 512. Then, the cancellation control unit 543 determines whether or not a region with the region ID acquired in a Step S211 falls within the identified accessible range (second condition). In addition, the cancellation control unit 543 determines whether or not the image capturing time acquired in Step S231 falls within a range of a predetermined period including the identified usage application period (third condition). Note that the predetermined period may include a period corresponding to about 15 minutes before and after the usage application period.

In a case where it is determined in Step S216 that the usage application conditions (the second condition and the third condition) are satisfied, the cancellation control unit 543 transmits a cancellation instruction via the network N to the authentication terminal 100*a* installed in a region corresponding to the region ID acquired in Step S211 (S217). In other words, the cancellation control unit 543 issues a cancellation instruction to the authentication terminal 100*a* being a request source of the face authentication request. Accordingly, the locking control unit 155 of the authentication terminal 100*a* receives a cancellation instruction from the history management apparatus 500 via the network N, and outputs the cancellation instruction to the gate device 200*a*. Then, the gate device 200*a* unlocks a gate in accordance with the received cancellation instruction. As a result, the visitor U21 can enter the entrance 300*a*.

After that, the history registration unit 544 registers the authentication history (history information) 515 into the storage unit 510 (S218). Specifically, the history registration unit 544 registers the image capturing time acquired in Step S211, or a time at which it is determined in Step S213 that face authentication has succeeded, as the authentication time and date 5151. In addition, the history registration unit 544 registers the region ID acquired in Step S211, or a region name (entrance 300*a*) corresponding to the region ID, as the authentication location 5152. In addition, the history registration unit 544 registers the user ID identified in Step S214, as the authenticated user ID 5153. In addition, the history registration unit 544 registers the face image acquired in Step S211, as the face image 5154. In addition, the history registration unit 544 registers the usage application information 512 identified in Step S215, as the usage application information 5155. Then, the history registration unit 544 stores the above-described authentication time and date 5151, the authentication location 5152, the authenticated user ID 5153, the face image 5154, and the usage application information 5155 into the storage unit 510 as the authentication history 515 in association with each other.

In a case where it is determined in Step S213 that face authentication has failed, or in a case where it is determined in Step S216 that the usage application conditions are not satisfied, the cancellation control unit 543 transmits (outputs) information indicating that cancellation is inexecutable, to the authentication terminal 100*a* via the network N (S219).

Figure 9:
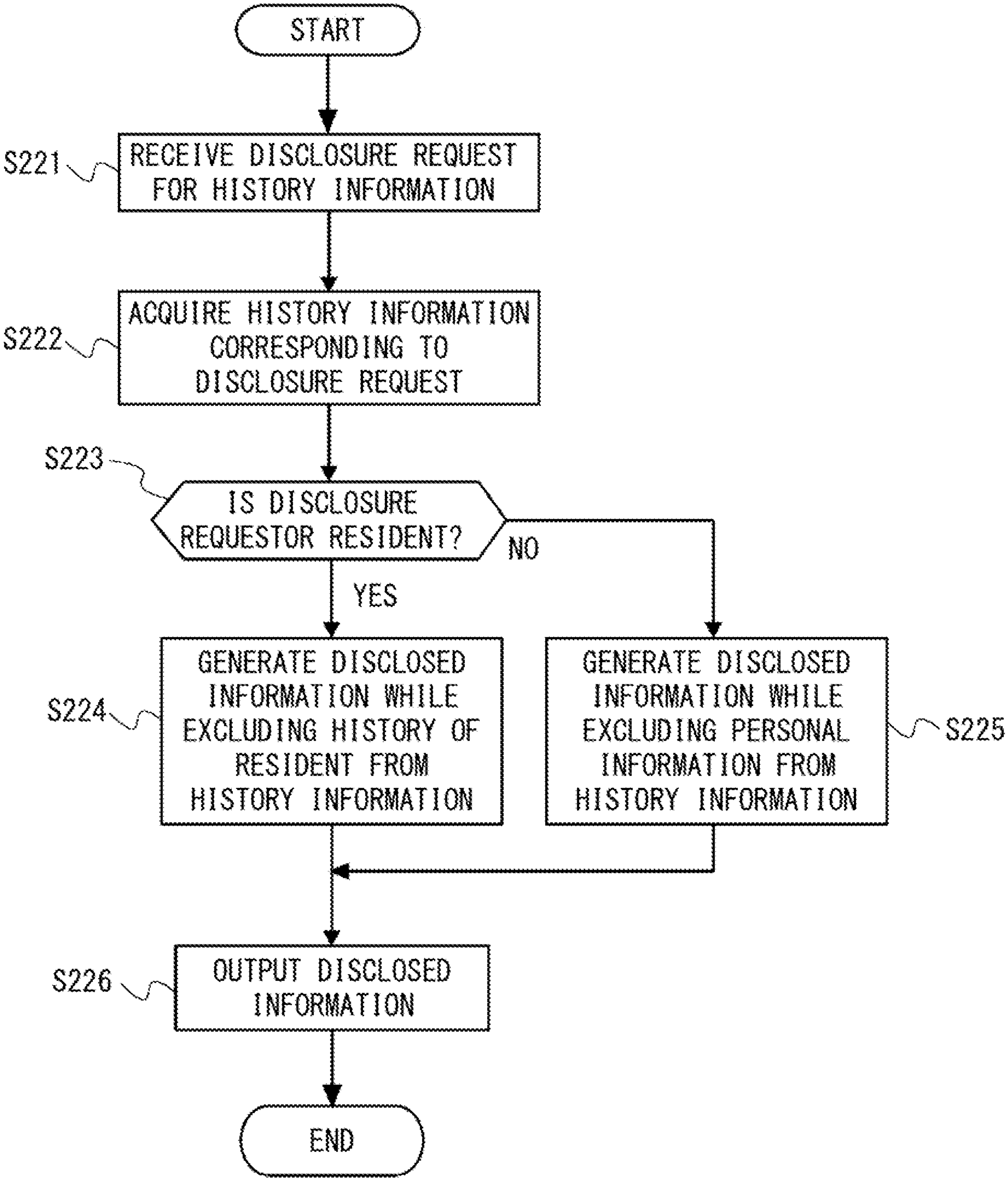
FIG. 9 is a flowchart illustrating a flow of history disclosure processing according to the second example embodiment.

FIG. 9 is a flowchart illustrating a flow of history disclosure processing according to the second example embodiment. Here, the description will be given of a case where the resident U11 issues a disclosure request for history information using the terminal 401. First of all, the history disclosure control unit 545 receives a disclosure request for history information from the terminal 401 via the network N (S221). Here, the disclosure request is assumed to include a user ID of the resident U11 being a disclosure requestor, information indicating a history disclosure target location (region ID of residence 300*e*), and a disclosure target period.

Next, the history disclosure control unit 545 acquires history information corresponding to the received disclosure request (S222). More specifically, the history disclosure control unit 545 uses a region ID included in the disclosure request, as the authentication location 5152, and searches the authentication history 515 for history information at the authentication time and date 5151 included in the disclosure target period. Here, it is assumed that one or more pieces of history information have been found by the search.

Then, the history disclosure control unit 545 determines whether or not a disclosure requestor is a resident (S223). Specifically, the history disclosure control unit 545 identifies, from the history disclosure recipient information 514, the attribute 5142 associated with the user ID 5141 included in the disclosure request. Then, the history disclosure control unit 545 determines whether or not the identified attribute indicates a resident. Here, it is assumed that the disclosure requestor is determined to be a resident.

Then, the history disclosure control unit 545 generates disclosed information while excluding a history of the resident from history information (S224). Specifically, first of all, the history disclosure control unit 545 excludes a history of which authenticated user ID 5153 indicates a disclosure requestor or a cohabiter thereof, from the history information acquired in Step S222. Alternatively, the history disclosure control unit 545 acquires a list of user IDs of residents of the residence 300*e* being a history disclosure target location, from the resident information 513, and excludes history information of which authenticated user ID 5153 is included in the list of the user IDs.

Then, the history disclosure control unit 545 generates disclosed information using the excluded history information. For example, the history disclosure control unit 545 includes, from among the excluded history information, the authentication time and date 5151, the authentication location 5152, and the face image 5154 into the disclosed information. In addition, the history disclosure control unit 545 identifies an authenticated user name from the authenticated user ID 5153 and the user information 5123 in the usage application information 5155 from among the excluded history information, and includes the authenticated user name into the disclosed information. In addition, the history disclosure control unit 545 identifies the applicant ID 5121 in the usage application information 5155 from among the excluded history information, and identifies the resident personal information 5133 associated with the identified applicant ID (the user ID 5131), from among the resident information 513. Then, the history disclosure control unit 545 identifies an applicant name from the identified resident personal information 5133, and includes the applicant name into the disclosed information. Note that the history disclosure control unit 545 may generate disclosed information as screen information in which each piece of the above-described information is arranged in a predetermined layout.

After that, the history disclosure control unit 545 outputs the generated disclosed information (S226). That is, the history disclosure control unit 545 transmits the disclosed information to the terminal 401 via the network N. Accordingly, the terminal 401 receives disclosed information from the history management apparatus 500 via the network N, and displays the disclosed information on a screen.

Figure 10:
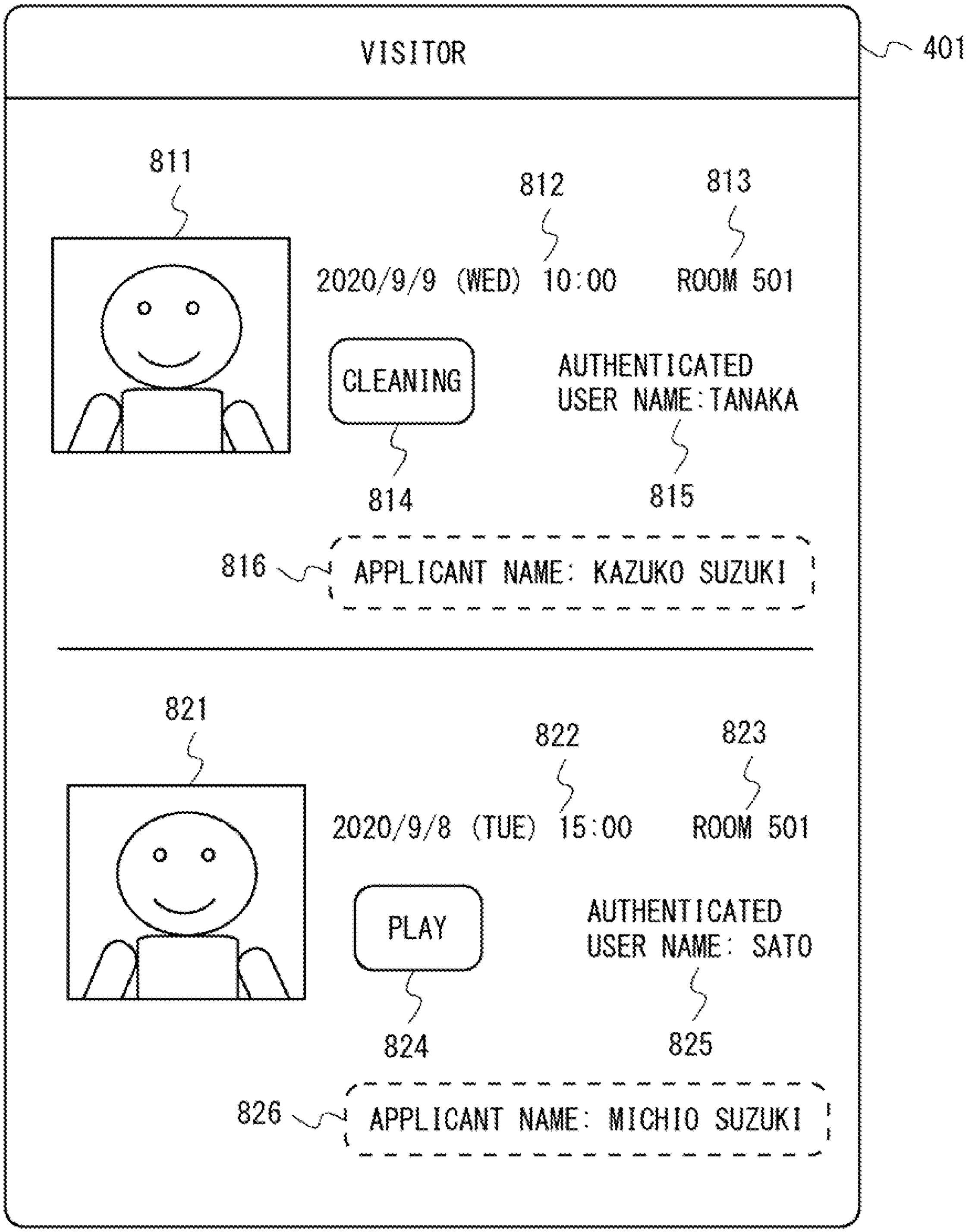
FIG. 10 is a diagram illustrating an example of disclosed information according to the second example embodiment.

FIG. 10 is a diagram illustrating an example of disclosed information according to the second example embodiment. Here, FIG. 10 illustrates an example in which disclosed information of two pieces of history information is displayed on the terminal 401. The first disclosed information includes a face image 811, authentication time and date 812, an authentication location 813, a usage purpose 814, an authenticated user name 815, and an applicant name 816. The face image 811 indicates a face image of a user with the authenticated user name 815 "Tanaka" who has been subjected to face authentication (or image capturing) at the authentication time and date 812 "2020/9/9 (Wed) 10:00" by the authentication terminal 100 installed at a gateway of the authentication location 813 "room 501". The usage purpose 814 indicates that a usage purpose of the authenticated user is "cleaning". In addition, the applicant name 816 indicates that a usage application for the authenticated user has been made by "Kazuko Suzuki".

The second disclosed information includes a face image 821, authentication time and date 822, an authentication location 823, a usage purpose 824, an authenticated user name 825, and an applicant name 826. The face image 821 indicates a face image of a user with the authenticated user name 825 "Sato" who has been subjected to face authentication (or image capturing) at the authentication time and date 822 "2020/9/8 (Tue) 15:00" by the authentication terminal 100 installed at a gateway of the authentication location 823 "room 501". The usage purpose 824 indicates that a usage purpose of the authenticated user is "play" (with a child of a resident). In addition, the applicant name 826 indicates that a usage application for the authenticated user has been made by "Michio Suzuki".

In this manner, in the present example embodiment, a resident of the complex housing 700 can refer to a visiting history of a visitor (other than residents) of its residence. At this time, as illustrated in FIG. 10, information (name, or the like) regarding an applicant is also disclosed. Thus, even if the resident U11 itself has not made an application, the resident U11 can recognize who has made an application among family members.

In addition, when the resident U11 issues a disclosure request, the resident U11 may designate a common facility (for example, theater room 300*c*, study room, or the like) as a history disclosure target location aside from its residence. In addition, even in a case where a disclosure requestor is a resident, the history disclosure control unit 545 may leave histories of the disclosure requestor and a cohabiter in history information. For example, the terminal 401 transmits a disclosure request including region IDs of the residence 300*e* and the theater room 300*c* as history disclosure target locations, to the history management apparatus 500. In this case, the history disclosure control unit 545 acquires, from among the authentication history 515, first history information in which the authentication location 5152 corresponds to the residence 300*e*. At this time, the history disclosure control unit 545 may avoid excluding histories of a disclosure requestor and a cohabiter from the acquired first history information. Note that it is assumed that the first history information can be referred to only in a unit of each resident (family) of a residence. This is because the first history information includes a history of authentication at a location requiring privacy protection. In addition, the history disclosure control unit 545 acquires, from among the authentication history 515, second history information in which the authentication location 5152 corresponds to the theater room

300*c*. At this time, the history disclosure control unit 545 may include a resident of the residence 300*e* in addition to a visitor (friend or the like), from the acquired second history information. For example, the history disclosure control unit 545 extracts history information in which an applicant is a resident of the residence 300*e*, from an authentication history of the theater room 300*c*. Note that, because the second history information is an authentication history of a common facility, a resident of the complex housing 700 is assumed to be able to refer to histories including a history of a resident of another residence. Then, the history disclosure control unit 545 generates disclosed information while merging the first history information and the second history information. Thus, the terminal 401 displays the above-described merged disclosed information. As a result, the resident U11 can check that a family uses a common facility aside from the residence 300*e* of itself. Moreover, the resident U11 can check a visiting history of a housekeeper to the residence 300*e* of itself, similarly to the above-described example.

Next, the description will be given of a case where the developer U3 of the complex housing 700 issues a disclosure request for history information using the terminal 402. First of all, the history disclosure control unit 545 receives a disclosure request for history information from the terminal 402 via the network N (S221). Here, the disclosure request is assumed to include a user ID of the developer U3 being a disclosure requestor, information indicating a history disclosure target location (region ID of theater room 300*c*), and a disclosure target period. The processing in Step S222 is similar to the above-described processing. Then, in Step S223, the history disclosure control unit 545 determines that a disclosure requestor is a user other than a resident.

Then, the history disclosure control unit 545 generates disclosed information while excluding personal information from history information (S225). Specifically, first of all, the history disclosure control unit 545 excludes personal information from among the face image 5154 and the user information 5123 in the usage application information 5155, from the history information acquired in Step S222. Furthermore, the history disclosure control unit 545 excludes, from among the excluded history information, the resident personal information 5133 associated with the applicant ID 5121 (the user ID 5131) in the usage application information 5155. In other words, the history disclosure control unit 545 leaves attribute information related to a user and an applicant, from among the history information acquired in Step S222.

Then, the history disclosure control unit 545 generates disclosed information using the excluded history information. For example, the history disclosure control unit 545 includes, from among the excluded history information, the authentication time and date 5151 and the authentication location 5152 into the disclosed information. In addition, the history disclosure control unit 545 identifies attribute information from the authenticated user ID 5153 and the user information 5123 in the usage application information 5155 from among the excluded history information, and includes the attribute information into the disclosed information. In addition, the history disclosure control unit 545 identifies the applicant ID 5121 in the usage application information 5155 from among the excluded history information, and identifies the attribute 5132 associated with the identified applicant ID (the user ID 5131), from among the resident information 513. Then, the history disclosure control unit 545 includes the identified attribute 5132 into the disclosed information. Note that the history disclosure control unit 545 may generate disclosed information as screen information in which each piece of the above-described information is arranged in a predetermined layout.

After that, the history disclosure control unit 545 outputs the generated disclosed information (S226). That is, the history disclosure control unit 545 transmits the disclosed information to the terminal 402 via the network N. Accordingly, the terminal 402 receives disclosed information from the history management apparatus 500 via the network N, and displays the disclosed information on a screen.

Figure 11:
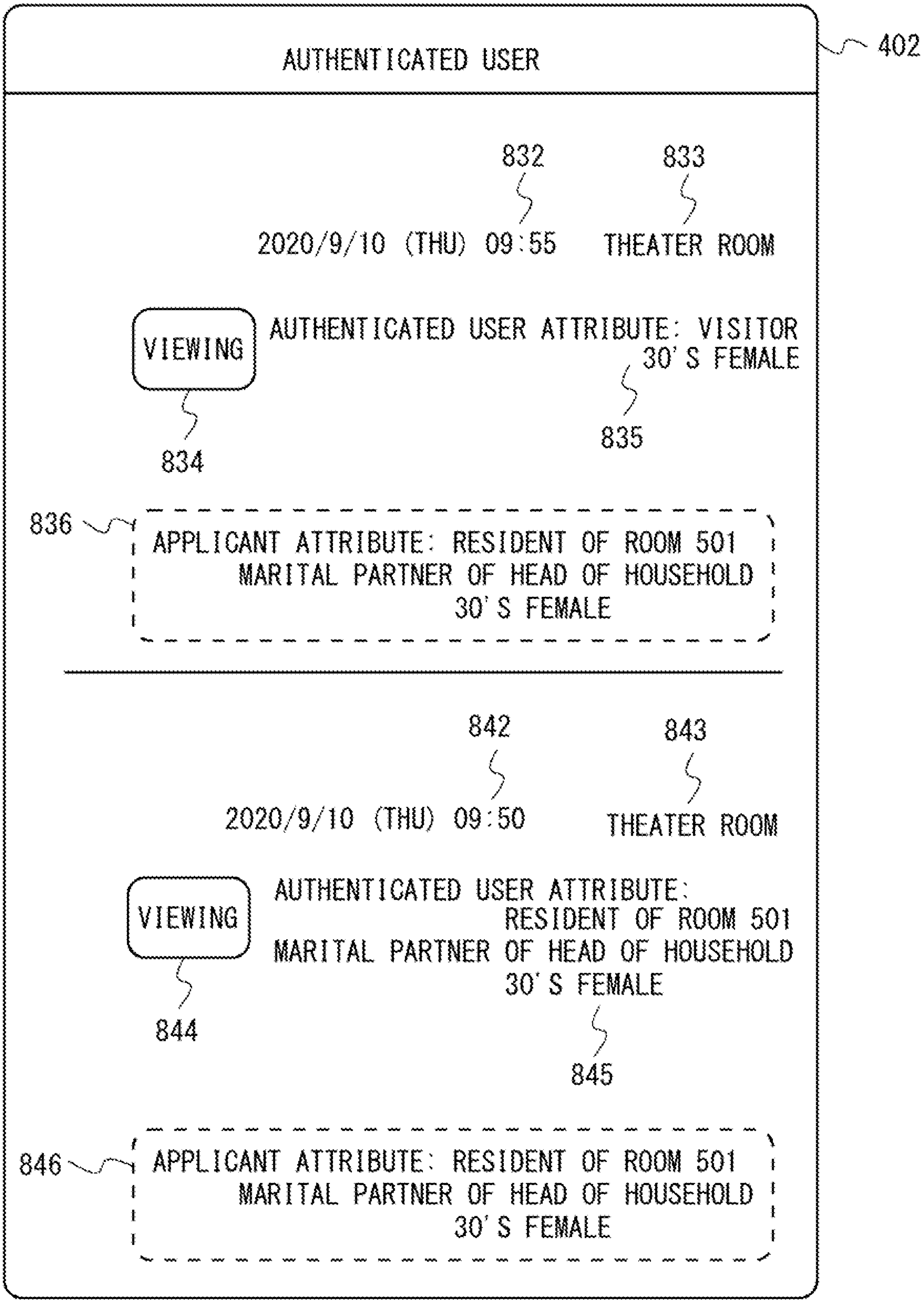
FIG. 11 is a diagram illustrating an example of disclosed information according to the second example embodiment.

FIG. 11 is a diagram illustrating an example of disclosed information according to the second example embodiment. Here, FIG. 11 illustrates an example in which disclosed information of two pieces of history information is displayed on the terminal 402. The first disclosed information includes authentication time and date 832, an authentication location 833, a usage purpose 834, an authenticated user attribute 835, and an applicant attribute 836. The authenticated user attribute 835 indicates information from which personal information of an authenticated user is not identified. Here, the authenticated user attribute 835 indicates that a user is not a resident, an age group, and gender as an attribute. In addition, the applicant attribute 836 indicates information from which personal information of an applicant is not identified. Here, the applicant attribute 836 indicates that an applicant is a resident of a room 501, is a marital partner of a head of a household, and is a 30's female.

The second disclosed information includes authentication time and date 842, an authentication location 843, a usage purpose 844, an authenticated user attribute 845, and an applicant attribute 846. The authenticated user attribute 845 indicates that a user is a resident and has the same attribute as the applicant attribute 836.

In this manner, in the present example embodiment, a user other than a resident of the complex housing 700 can refer to a usage status of a common facility. At this time, as illustrated in FIG. 11, personal information is protected. On the other hand, a developer or the like of a condominium building can recognize an attribute of a user of a common facility in detail. Thus, the information can be utilized for marketing of condominium building development, or the like. In addition, in a case where a building manager is not a resident of the complex housing 700, it is possible to consider the necessity of repair of a common facility through the recognition of a usage status of the common facility. In addition, a management association includes a resident, but in a case where the resident refers to a usage status of a common facility in quality of the management association (in quality of a user other than a legitimate user of a residence), it is desirable that personal information of residents and visitors is masked.

In addition, a resident may refer to a usage status of a common facility. That is, a disclosure requestor may be an arbitrary resident of the complex housing 700. Also in this case, similarly to FIG. 11 described above, an arbitrary resident can check a usage status of a common facility of the complex housing 700 in a state in which personal information is masked.

Third Example Embodiment

A third example embodiment is a modification of the second example embodiment described above. The third example embodiment incorporates a biometric authentication function into a history management apparatus. Because a history management system according to the third example embodiment is similar to the history management system

1000 described above, in which the authentication apparatus 600 is incorporated into a history management apparatus 500*a*, the illustration and description will be omitted.

Figure 12:
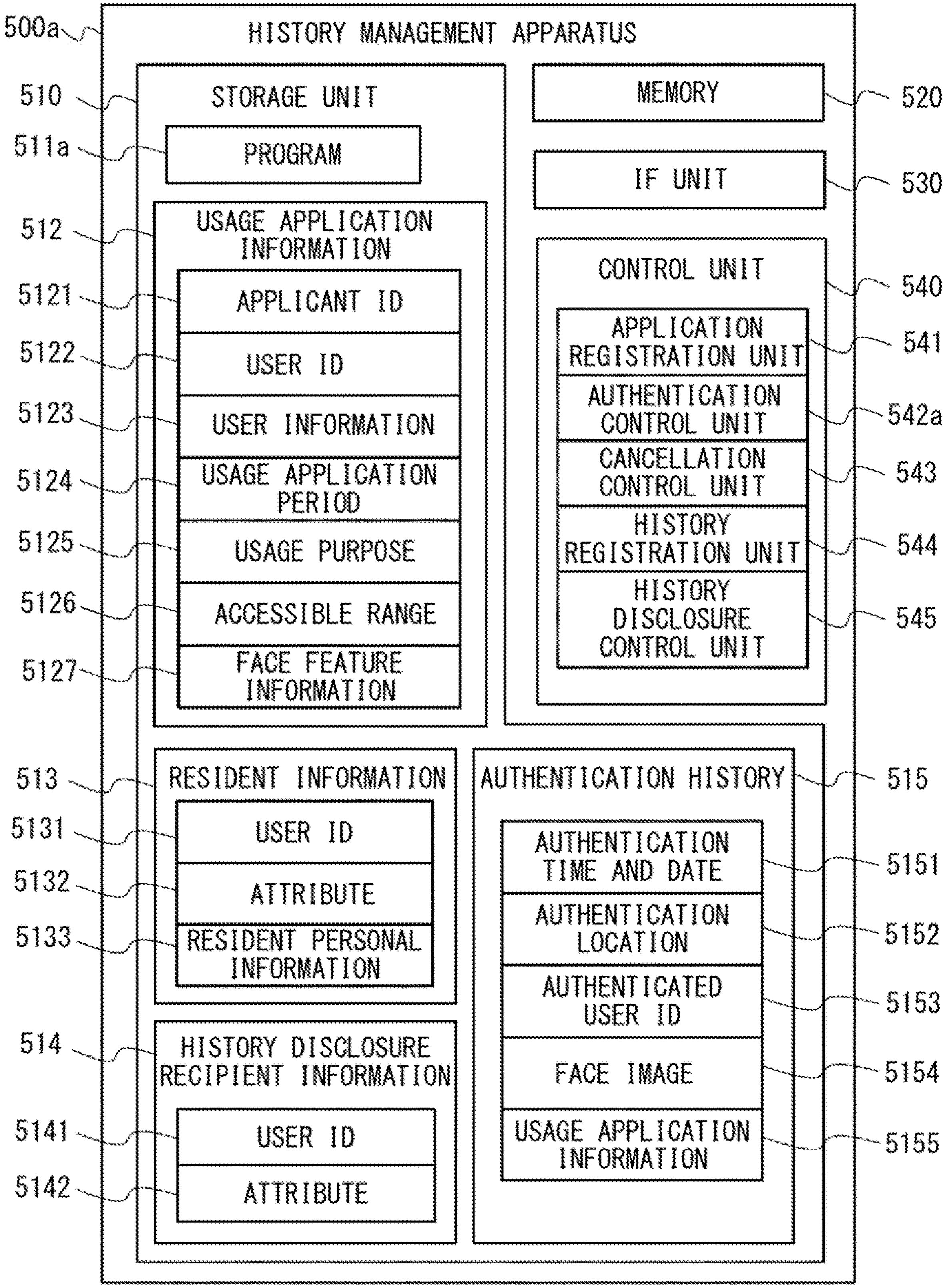
FIG. 12 is a block diagram illustrating a configuration of a history management apparatus according to a third example embodiment.

FIG. 12 is a block diagram illustrating a configuration of the history management apparatus 500*a* according to the third example embodiment. In the storage unit 510 of the history management apparatus 500*a*, as compared with that in the history management apparatus 500 described above, the program 511 is replaced with a program 511*a*, and face feature information 5127 is added to the usage application information 512. Note that the face feature information 5127 is an example of biometric information. In addition, in a control unit 540 of the history management apparatus 500*a*, as compared with that in the history management apparatus 500 described above, the authentication control unit 542 is replaced with an authentication control unit 542*a*.

The program 511*a* is a computer program in which the processing of a history management method according to the third example embodiment is implemented.

The face feature information 5127 corresponds to the face feature information 612 of the authentication apparatus 600 described above. The face feature information 5127 is associated with a user ID 5122. That is, the usage application information 512 encompasses the face information DB 610 described above.

The authentication control unit 542*a* controls face authentication by collating face feature information of a visitor with face feature information of a plurality of persons. More specifically, the authentication control unit 542*a* collates face feature information extracted from a face region of a user included in an acquired face image, with the face feature information 5127 stored in the storage unit 510, to perform face authentication, thereby acquiring a face authentication result.

Note that, in the present example embodiment, Step 212 of FIG. 8 described above is replaced with face authentication processing in the history management apparatus 500*a* that is executed by the authentication control unit 542*a*.

As described above, the same effects as those of the second example embodiment described above can be achieved by the third example embodiment.

Other Example Embodiments

Note that, the biometric authentication described above has been described as face authentication (single modal) in principle, but face authentication+iris authentication (multimodal) may be used for a door of a residence or payment that requires higher security. In this case, an authentication terminal includes an infrared camera in addition to the camera 110.

The history management apparatuses 500 and 500*a* described above may further include notification means for notifying, in a case where restriction on entry into a region is cancelled by the cancellation control unit 543, a terminal of an applicant who has made a usage application for a region, of information indicating the cancellation. As a result, an applicant can recognize, in real time, actual visiting of a visitor for which a usage application has been made.

Note that, although the hardware configuration has been described in the above-described example embodiments, the present disclosure is not limited thereto. According to the present disclosure, arbitrary processing can also be implemented by causing a CPU to execute a computer program.

In the above example, the program can be stored using various types of non-transitory computer-readable media and supplied to a computer. The non-transitory computer-readable media include various types of tangible storage media. Examples of the non-transitory computer-readable medium include a magnetic recording medium (for example, a flexible disk, a magnetic tape, or a hard disk drive), an optical magnetic recording medium (for example, a magneto-optical disk), a compact disc-read only memory (CD-ROM), a CD-R, a CD-R/W, a digital versatile disc (DVD), and a semiconductor memory such as a mask ROM, a programmable ROM (PROM), an erasable PROM (EPROM), a flash ROM, or a random access memory (RAM). In addition, the program may be supplied to the computer by various types of transitory computer-readable media. Examples of the transitory computer-readable medium include an electric signal, an optical signal, and electromagnetic waves. The transitory computer-readable medium can provide the program to the computer via a wired communication line such as electric wires and optical fibers or a wireless communication line.

Note that the present disclosure is not limited to the above example embodiments, and can be appropriately changed without departing from the gist. Furthermore, the present disclosure may be implemented by appropriately combining the respective example embodiments.

Some or all of the above example embodiments can be described as the following supplementary notes, but are not limited to the following.

(Supplementary Note A1)

A history management apparatus including:

storage means for storing usage application information of a user in a region into which entry is restricted by biometric authentication;

cancellation control means for canceling, in a case where a predetermined visitor has succeeded in biometric authentication at a gateway of the region, and the usage application information is satisfied, restriction on entry into the region;

history registration means for registering, into the storage means, history information of a visitor who has succeeded in the biometric authentication;

generation means for generating, in a case where a disclosure request for the history information has been received from a terminal of a predetermined disclosure requestor, disclosed information obtained by performing predetermined processing on the history information in accordance with an attribute of the disclosure requestor; and output means for outputting the disclosed information to the terminal.

(Supplementary Note A2)

The history management apparatus according to Supplementary Note A1, wherein, in a case where an attribute of the disclosure requestor is an attribute other than a legitimate user of a facility including the region, the generation means performs processing of excluding personal information from the history information.

(Supplementary Note A3)

The history management apparatus according to Supplementary Note A1 or A2, wherein, in a case where an attribute of the disclosure requestor is a legitimate user of a facility including the region, the generation means performs processing of excluding, from the history information, information obtained in a case where the visitor is the legitimate user.

(Supplementary Note A4)

The history management apparatus according to any one of Supplementary Notes A1 to A3, wherein the usage application information includes applicant information regarding an applicant who has made a usage application for the region, the generation means identifies the applicant information corresponding to the history information, from among the usage application information, and the generation means generates the disclosed information including the identified applicant information.

(Supplementary Note A5)

The history management apparatus according to any one of Supplementary Notes A1 to A4, wherein the usage application information further includes a usage purpose of the region of the user, the generation means identifies the usage purpose corresponding to the history information, from among the usage application information, and the generation means generates the disclosed information including the identified usage purpose.

(Supplementary Note A6)

The history management apparatus according to any one of Supplementary Notes A1 to A5, wherein the generation means generates the disclosed information including information regarding a location where the visitor has succeeded in the biometric authentication.

(Supplementary Note A7)

The history management apparatus according to any one of Supplementary Notes A1 to A6, further including notification means for notifying, in a case where restriction on entry into the region is cancelled by the cancellation control means, a terminal of an applicant who has made a usage application for the region, of information indicating the cancellation.

(Supplementary Note B1)

A history management system including:

an authentication terminal installed at a gateway of a region into which entry is restricted by biometric authentication;

a history management apparatus configured to manage history information of cancellation of entry restriction; and a terminal of a disclosure requestor for the history information, wherein the history management apparatus includes storage means for storing usage application information of a user in the region, cancellation control means for canceling, in a case where a predetermined visitor has succeeded in biometric authentication via the authentication terminal, and the usage application information is satisfied, restriction on entry into the region, history registration means for registering, into the storage means, history information of a visitor who has succeeded in the biometric authentication, generation means for generating, in a case where a disclosure request for the history information has been received from the terminal, disclosed information obtained by performing predetermined processing on the history information in accordance with an attribute of the disclosure requestor, and output means for outputting the disclosed information to the terminal.

(Supplementary Note B2)

The history management system according to Supplementary Note B1, wherein, in a case where an attribute of the disclosure requestor is an attribute other than a legitimate user of a facility including the region, the generation means performs processing of excluding personal information from the history information.

(Supplementary Note C1)

A history management method to be executed by a computer, the history management method including:

canceling, in a case where a predetermined visitor has succeeded in biometric authentication at a gateway of a region into which entry is restricted by biometric authentication, and usage application information of a user in the region is satisfied, restriction on entry into the region;

registering, into a storage device, history information of a visitor who has succeeded in the biometric authentication;

generating, in a case where a disclosure request for the history information has been received from a terminal of a predetermined disclosure requestor, disclosed information obtained by performing predetermined processing on the history information in accordance with an attribute of the disclosure requestor; and outputting the disclosed information to the terminal.

(Supplementary Note D1)

A non-transitory computer-readable medium storing a history management program for causing a computer to execute:

processing of canceling, in a case where a predetermined visitor has succeeded in biometric authentication at a gateway of a region into which entry is restricted by biometric authentication, and usage application information of a user in the region is satisfied, restriction on entry into the region;

processing of registering, into a storage device, history information of a visitor who has succeeded in the biometric authentication;

processing of generating, in a case where a disclosure request for the history information has been received from a terminal of a predetermined disclosure requestor, disclosed information obtained by performing predetermined processing on the history information in accordance with an attribute of the disclosure requestor; and processing of outputting the disclosed information to the terminal.

Although the present invention has been described with reference to the example embodiments (and examples), the present invention is not limited to the above example embodiments (and examples). Various modifications that can be understood by those skilled in the art can be made to the configuration and details of the present invention within the scope of the present invention.

REFERENCE SIGNS LIST

1 HISTORY MANAGEMENT APPARATUS
11 STORAGE UNIT
111 USAGE APPLICATION INFORMATION
12 CANCELLATION CONTROL UNIT
13 HISTORY REGISTRATION UNIT
14 GENERATION UNIT
15 OUTPUT UNIT
1000 HISTORY MANAGEMENT SYSTEM
100 AUTHENTICATION TERMINAL
110 CAMERA
120 STORAGE UNIT
130 COMMUNICATION UNIT
140 INPUT-OUTPUT UNIT

150 CONTROL UNIT
151 IMAGING CONTROL UNIT
152 REGISTRATION UNIT
153 AUTHENTICATION CONTROL UNIT
154 DISPLAY CONTROL UNIT
155 LOCKING CONTROL UNIT
100*a* to 100*e* AUTHENTICATION TERMINAL
200 GATE DEVICE
200*a* to 200*e* GATE DEVICE
300 REGION
300*a* ENTRANCE
300*b* EV HALL
300*c* THEATER ROOM
300*d* RESIDENCE
300*e* RESIDENCE
401 TERMINAL
402 TERMINAL
500 HISTORY MANAGEMENT APPARATUS
500*a* HISTORY MANAGEMENT APPARATUS
510 STORAGE UNIT
511 PROGRAM
511*a* PROGRAM
512 USAGE APPLICATION INFORMATION
5121 APPLICANT ID
5122 USER ID
5123 USER INFORMATION
5124 USAGE APPLICATION PERIOD
5125 USAGE PURPOSE
5126 ACCESSIBLE RANGE
5127 FACE FEATURE INFORMATION
513 RESIDENT INFORMATION
5131 USER ID
5132 ATTRIBUTE
5133 RESIDENT PERSONAL INFORMATION
514 HISTORY DISCLOSURE RECIPIENT INFORMATION
5141 USER ID
5142 ATTRIBUTE
515 AUTHENTICATION HISTORY
5151 AUTHENTICATION TIME AND DATE
5152 AUTHENTICATION LOCATION
5153 AUTHENTICATED USER ID
5154 FACE IMAGE
5155 USAGE APPLICATION INFORMATION
520 MEMORY
530 IF UNIT
540 CONTROL UNIT
541 APPLICATION REGISTRATION UNIT
542 AUTHENTICATION CONTROL UNIT
542*a* AUTHENTICATION CONTROL UNIT
543 CANCELLATION CONTROL UNIT
544 HISTORY REGISTRATION UNIT
545 HISTORY DISCLOSURE CONTROL UNIT
600 AUTHENTICATION APPARATUS
610 FACE INFORMATION DB
611 USER ID
612 FACE FEATURE INFORMATION
620 FACE DETECTION UNIT
630 FEATURE POINT EXTRACTION UNIT
640 REGISTRATION UNIT
650 AUTHENTICATION UNIT
700 COMPLEX HOUSING
811 FACE IMAGE
812 AUTHENTICATION TIME AND DATE
813 AUTHENTICATION LOCATION
814 USAGE PURPOSE
815 AUTHENTICATED USER NAME
816 APPLICANT NAME
821 FACE IMAGE
822 AUTHENTICATION TIME AND DATE
823 AUTHENTICATION LOCATION
824 USAGE PURPOSE
825 AUTHENTICATED USER NAME
826 APPLICANT NAME
832 AUTHENTICATION TIME AND DATE
833 AUTHENTICATION LOCATION
834 USAGE PURPOSE
835 AUTHENTICATED USER ATTRIBUTE
836 APPLICANT ATTRIBUTE
N NETWORK
U11 RESIDENT
U12 RESIDENT
U21 VISITOR
U22 FRIEND
U23 HOUSEKEEPER
U3 DEVELOPER

What is claimed is:

1. A history management apparatus comprising:

at least one storage device configured to store instructions and usage application information of a user in a region into which entry is restricted by biometric authentication; and at least one processor configured to execute the instructions to:

cancel, in a case where biometric authentication a predetermined visitor has succeeded at a gateway of the region and where the usage application information is satisfied, restriction of entry into the region;

register, into the at least one storage device, history information of a visitor of which the biometric authentication has succeeded;

generate, in a case where a disclosure request for the history information has been received from a terminal of a disclosure requestor, disclosed information based on the history information in accordance with an attribute of the disclosure requestor;

generate, in a case where an attribute of the disclosure requestor is an attribute other than a legitimate user of a facility including the region, the disclosed information by excluding personal information from the history information; and output the disclosed information to the terminal.

2. The history management apparatus according to claim 1, wherein the at least one processor is further configured to execute the instructions to:

in a case where the attribute of the disclosure requestor is the legitimate user of the facility including the region, perform processing of excluding, from the history information, information obtained in a case where the visitor is the legitimate user.

3. The history management apparatus according to claim 1, wherein the usage application information includes applicant information regarding an applicant who has made a usage application for the region, and wherein the at least one processor is further configured to execute the instructions to:

identify the applicant information corresponding to the history information, from among the usage application information, and generate the disclosed information including the identified applicant information.

4. The history management apparatus according to claim 1, wherein the usage application information further includes a usage purpose of the region of the user, and wherein the at least one processor is further configured to execute the instructions to:

identify the usage purpose corresponding to the history information, from among the usage application information, and generate the disclosed information including the identified usage purpose.

5. The history management apparatus according to claim 1, wherein the at least one processor is further configured to execute the instructions to:

generate the disclosed information including information regarding a location where the visitor has succeeded in the biometric authentication.

6. The history management apparatus according to claim 1, wherein the at least one processor is further configured to execute the instructions to:

output, in a case where restriction of entry into the region is cancelled, information indicating cancellation to a terminal of an applicant who has made a usage application for the region.

7. A history management system comprising:

an authentication terminal installed at a gateway of a region into which entry is restricted by biometric authentication;

a history management apparatus configured to manage history information of cancellation of entry restriction; and a terminal of a disclosure requestor for the history information, wherein the history management apparatus includes:

at least one storage device configured to store instructions and usage application information of a user in the region, and at least one processor configured to execute the instructions to:

cancel, in a case where biometric authentication of a predetermined visitor via the authentication terminal has succeeded, and where the usage application information is satisfied, restriction of entry into the region, register, into the at least one storage device, history information of a visitor of which the biometric authentication has succeeded, generate, in a case where a disclosure request for the history information has been received from the terminal, disclosed information based on the history information in accordance with an attribute of the disclosure requestor, generate, in a case where an attribute of the disclosure requestor is an attribute other than a legitimate user of a facility including the region, the disclosed information by excluding personal information from the history information; and output the disclosed information to the terminal.

8. A history management method performed by a computer and comprising:

canceling, in a case where biometric authentication of a predetermined visitor has succeeded at a gateway of a region into which entry is restricted, and where usage application information of a user in the region is satisfied, restriction of entry into the region;

registering, into a storage device, history information of a visitor of which the biometric authentication has succeeded;

generating, in a case where a disclosure request for the history information has been received from a terminal of a disclosure requestor, disclosed information based on the history information in accordance with an attribute of the disclosure requestor;

generating, in a case where an attribute of the disclosure requestor is an attribute other than a legitimate user of a facility including the region, the disclosed information by excluding personal information from the history information; and outputting the disclosed information to the terminal.

9. A non-transitory computer-readable medium storing a history management program executable by a computer to perform processing comprising:

canceling, in a case where biometric authentication of a predetermined visitor has succeeded at a gateway of a region into which entry is restricted, and where usage application information of a user in the region is satisfied, restriction of entry into the region;

registering, into a storage device, history information of a visitor of which the biometric authentication has succeeded;

generating, in a case where a disclosure request for the history information has been received from a terminal of a disclosure requestor, disclosed information based on the history information in accordance with an attribute of the disclosure requestor;

generating, in a case where an attribute of the disclosure requestor is an attribute other than a legitimate user of a facility including the region, the disclosed information by excluding personal information from the history information; and outputting the disclosed information to the terminal.

* * * * *